(12) United States Patent
Grundhoefer et al.

(10) Patent No.: US 11,699,412 B2
(45) Date of Patent: Jul. 11, 2023

(54) APPLICATION PROGRAMMING INTERFACE FOR SETTING THE PROMINENCE OF USER INTERFACE ELEMENTS

(71) Applicant: APPLE INC., Cupertino, CA (US)

(72) Inventors: Anselm Grundhoefer, Campbell, CA (US); Geoffrey Grant Stahl, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/687,088

(22) Filed: Mar. 4, 2022

(65) Prior Publication Data

US 2022/0189433 A1    Jun. 16, 2022

Related U.S. Application Data

(63) Continuation of application No. 16/839,033, filed on Apr. 2, 2020, now Pat. No. 11,302,285.

(60) Provisional application No. 62/847,513, filed on May 14, 2019.

(51) Int. Cl.
*G09G 5/02*      (2006.01)
*G06T 3/00*      (2006.01)
*G02B 27/00*     (2006.01)
*G06T 7/194*     (2017.01)
*G06T 7/90*      (2017.01)

(52) U.S. Cl.
CPC ......... *G09G 5/026* (2013.01); *G02B 27/0093* (2013.01); *G06T 3/0056* (2013.01); *G06T 7/194* (2017.01); *G06T 7/90* (2017.01)

(58) Field of Classification Search
None
See application file for complete search history.

(56) References Cited

U.S. PATENT DOCUMENTS

| 2006/0208154 A1* | 9/2006 | Hughes ..................... G01T 7/00 250/208.1 |
| 2013/0094682 A1 | 4/2013 | Lee et al. |
| 2015/0177518 A1 | 6/2015 | Wong et al. |

(Continued)

OTHER PUBLICATIONS

Jens Grubert et al. "Towards pervasive augmented reality: Context-awareness in augmented reality." IEEE transactions on visualization and computer graphics 23.6 (2016): 1706-1724.

(Continued)

*Primary Examiner* — James A Thompson
(74) *Attorney, Agent, or Firm* — Fernando & Partners, LLP

(57) ABSTRACT

In one implementation, a method includes: displaying a UI element as an overlay in a UI associated with a first FOV, wherein the first FOV is characterized by a first viewing vector of a physical environment; detecting a change from the first FOV to a second FOV, wherein the second FOV is characterized by a second viewing vector of the physical environment; and in response to detecting the change from the first FOV to the second FOV, determining a prominence-display value for the UI element; if the prominence-display value for the UI element exceeds a prominence threshold, displaying the UI element as the overlay in the UI associated with the second FOV; and if the prominence-display value for the UI element does not exceed the prominence threshold, ceasing display of the UI element in the UI associated with the second FOV.

22 Claims, 17 Drawing Sheets

(56) References Cited

U.S. PATENT DOCUMENTS

2016/0140868 A1 5/2016 Lovett et al.
2016/0370855 A1* 12/2016 Lanier .................... H04N 23/58
2017/0154471 A1 6/2017 Woo et al.

OTHER PUBLICATIONS

Stefanie Zollmann et al. "Augmented reality for construction site monitoring and documentation." Proceedings of the IEEE 102.2 (2014): 137-154.

* cited by examiner

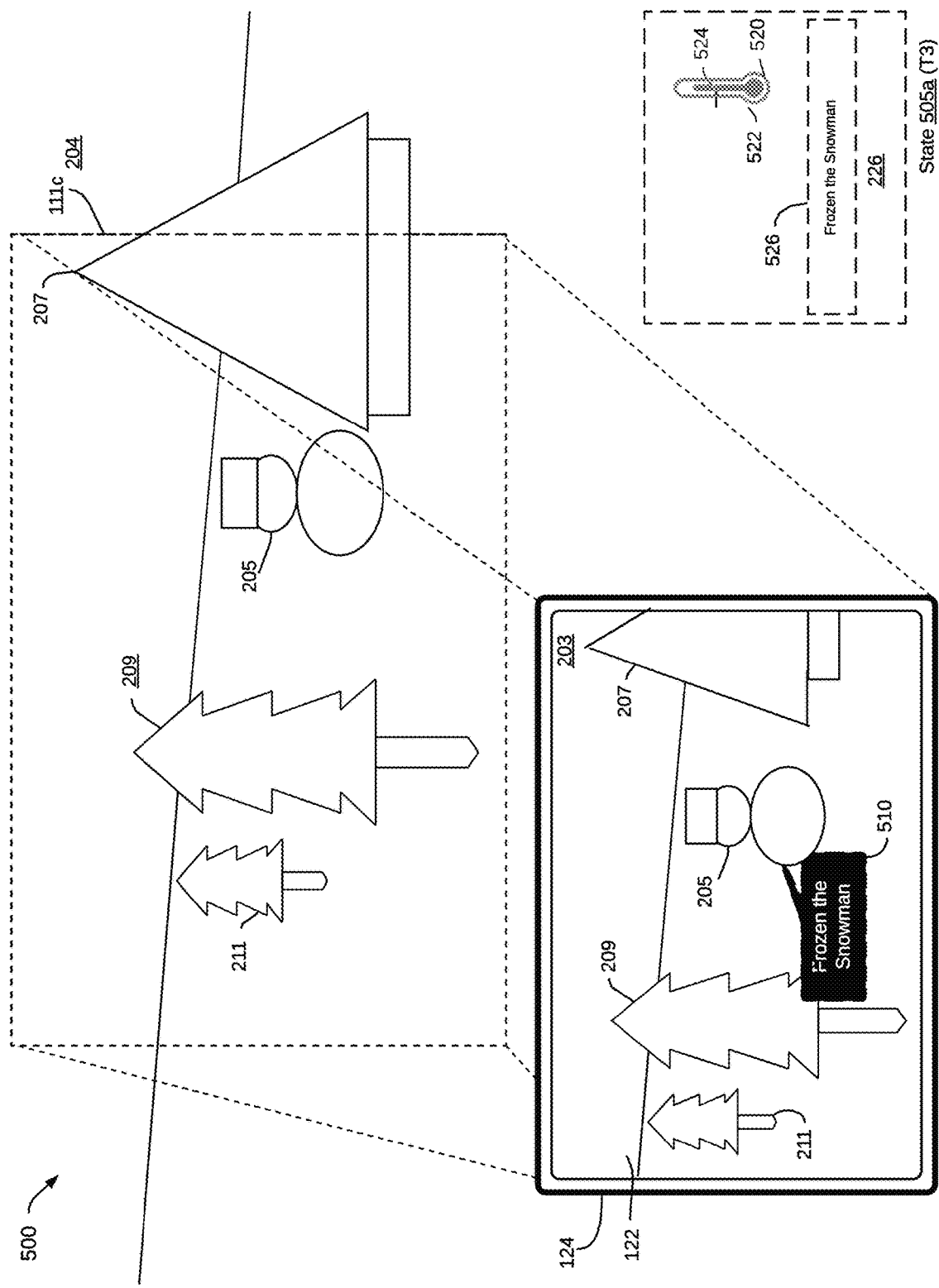

APPLICATION PROGRAMMING INTERFACE FOR SETTING THE PROMINENCE OF USER INTERFACE ELEMENTS

CROSS-REFERENCE TO RELATED APPLICATIONS

This application claims the benefit of U.S. Provisional Patent App. No. 62/847,513, filed on May 14, 2019 and U.S. Non-Provisional patent application Ser. No. 16/839,033, filed on Apr. 2, 2020, which are herein incorporated by reference in their entireties.

TECHNICAL FIELD

The present disclosure generally relates to displaying user interface (UI) elements and, in particular, to determining a visual appearance of a UI element overlaid on an underlying physical environment based on a prominence-display value and environmental characteristics of the underlying physical environment.

BACKGROUND

In some instances, a user interface (UI) element associated with an application may lack visual prominence when overlaid on underlying content. For example, a white UI element may lack visual prominence when a device displays the white UI element overlaid on a snowy physical environment. As another example, a UI element with small font may lack visual prominence when the device displays the UI element overlaid on a cluttered physical environment. Furthermore, in some instances, an object associated with a UI element that is initially displayed as an overlay at a first location in a UI may no longer be visible in a second field-of-view of the device due to a change (e.g., eye movement, rotational head movement, translational movement, or the object moving) in first field-of-view. For example, a UI element associated with an emergency response vehicle that is visible in a first field-of-view of the device should be displayed even after the emergency response vehicle leaves the first field-of-view. However, the device ceases to display the UI element associated with the emergency response vehicle as soon as the emergency response vehicle is no longer visible in the second field-of-view regardless of the criticality of the UI element.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 5A-5E illustrate example presentation scenario sequences for maintaining a visual display of a UI element in accordance with some implementations.

Figure 1:
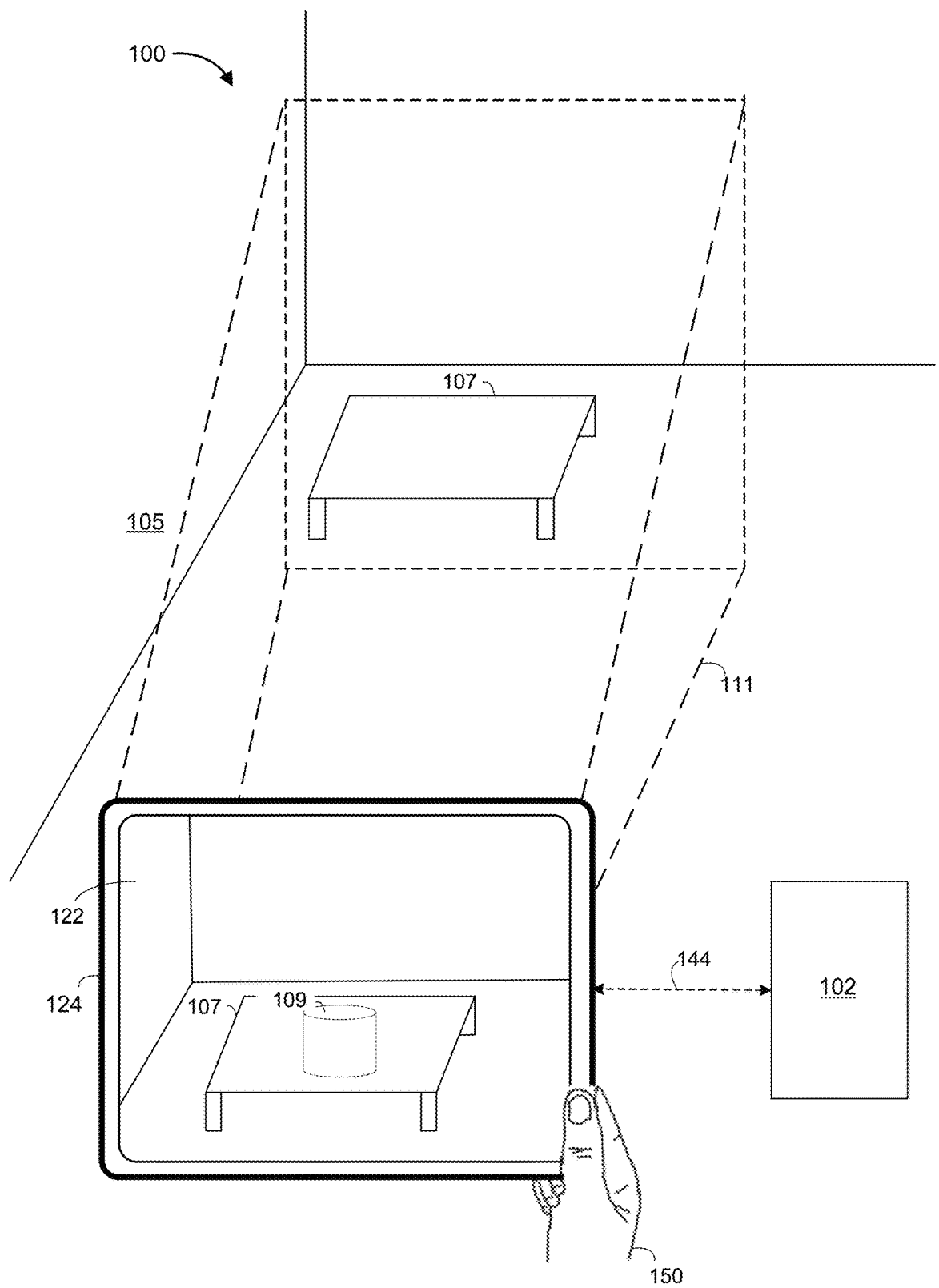
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for determining a visual appearance of a UI element overlaid on an underlying physical environment. According to some implementations, the method is performed at a device including one or more environmental sensors, one or more processors, a non-transitory memory, and a display. The method includes: obtaining, from the one or more environmental sensors, environmental data that corresponds to a physical environment; determining environmental characteristics of the physical environment based on the environmental data; in response to obtaining a request to display a user interface (UI) element, determining whether a prominence-display value associated with the UI element satisfies a prominence criterion; in response to determining that the prominence-display value for the UI element satisfies the prominence criterion: modifying one or more visual characteristics of the UI element based on the environmental characteristics of the physical environment, and displaying, via the display, the UI element as an overlay on the physical environment, wherein the UI element includes the one or more modified visual characteristics; and in response to determining that the prominence-display value for the UI element does not satisfy the prominence criterion, foregoing modifying the one or more visual characteristics of the UI element.

Various implementations disclosed herein include devices, systems, and methods for determining whether to display a representation of a UI element previously overlaid at a location in a first field-of-view in response to detecting a change to a second field-of-view. In various methods, the method is performed at a device including one or more processors, a non-transitory memory, and a display. The method includes: displaying, via the display, a UI element as an overlay at a first location in a UI associated with a first field-of-view of the device, wherein the first field-of-view is characterized by a first viewing vector of the physical environment; detecting a change from the first field-of-view to a second field-of-view of the device, wherein the second field-of-view is characterized by a second viewing vector of the physical environment that is different from the first viewing vector; and in response to detecting the change from the first field-of-view to the second field-of-view: in response to determining that a prominence-display value for the UI element satisfies a prominence criterion, displaying, via the display, a representation of the UI element as an overlay at a second location in the UI associated with the second field-of-view of the device; and in response to determining that the prominence-display value for the UI element does not satisfy the prominence criterion, ceasing display of the UI element on the UI.

In accordance with some implementations, a device includes a display, one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: a display, one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more CGR objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of CGR object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real-world objects (that is, physical articles from the physical environment or representations thereof). For example, a system may account for movements so that a virtual tree appears stationery with respect to the physical ground.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include near-eye systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A near-eye system may have one or more speaker(s) and an integrated opaque display. Alternatively, a near-eye system may be configured to accept an external opaque display (e.g., a smartphone). The near-eye system may incorporate one or more imaging sensors to capture images or video of the physical environment, and/or one or more microphones to capture audio of the physical environment. Rather than an opaque display, a near-eye system may have a transparent or translucent display. The display may utilize digital light projection, micro-electromechanical systems (MEMS), digital micromirror devices (DMDs), organic light-emitting diodes (OLEDs), light-emitting diodes (LEDs), micro-light-emitting diodes (μLEDs), liquid crystal on silicon (LCoS), laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 102 and an electronic device 124 (e.g., a tablet, mobile phone, laptop, wearable computing device, or the like).

In some implementations, the controller 102 is configured to manage and coordinate a CGR experience for a user 150 (sometimes also referred to herein as a "CGR environment") and zero or more other users. In some implementations, the controller 102 includes a suitable combination of software, firmware, and/or hardware. The controller 102 is described in greater detail below with respect to FIG. 9. In some implementations, the controller 102 is a computing device that is local or remote relative to the physical environment 105. For example, the controller 102 is a local server located within the physical environment 105. In another example, the controller 102 is a remote server located outside of the physical environment 105 (e.g., a cloud server, central server, etc.). In some implementations, the controller 102 is communicatively coupled with the electronic device 124 via one or more wired or wireless communication channels 144 (e.g., BLUETOOTH, IEEE 802.11x, IEEE 802.16x, IEEE 802.3x, etc.). In some implementations, the functions of the controller 102 are provided by the electronic device 124. As such, in some implementations, the components of the controller 102 are integrated into the electronic device 124.

In some implementations, the electronic device 124 is configured to present audio and/or video content to the user 150. In some implementations, the electronic device 124 is configured to present the CGR experience to the user 150. In some implementations, the electronic device 124 includes a suitable combination of software, firmware, and/or hardware. The electronic device 124 is described in greater detail below with respect to FIG. 10.

According to some implementations, the electronic device 124 presents a computer-generated reality (CGR) experience to the user 150 while the user 150 is physically present within a physical environment 105 that includes a table 107 within the field-of-view 111 of the electronic device 124. As such, in some implementations, the user 150 holds the electronic device 124 in his/her hand(s). In some implementations, while presenting the CGR experience, the electronic device 124 is configured to present CGR content (e.g., a CGR cylinder 109) and to enable video pass-through of the physical environment 105 (e.g., including the table 107) on a display 122. For example, the electronic device 124 corresponds to a mobile phone, tablet, laptop, wearable computing device, or the like.

In some implementations, the display 122 corresponds to an additive display that enables optical see-through of the physical environment 105 including the table 107. For example, the display 122 correspond to a transparent lens, and the electronic device 124 corresponds to a pair of glasses worn by the user 150. As such, in some implementations, the electronic device 124 presents a user interface by projecting the CGR content (e.g., the CGR cylinder 109) onto the additive display, which is, in turn, overlaid on the physical environment 105 from the perspective of the user 150. In some implementations, the electronic device 124 presents the user interface by displaying the CGR content (e.g., the CGR cylinder 109) on the additive display, which is, in turn, overlaid on the physical environment 105 from the perspective of the user 150.

In some implementations, the user 150 wears the electronic device 124 such as a near-eye system. As such, the electronic device 124 includes one or more displays provided to display the CGR content (e.g., a single display or one for each eye). For example, the electronic device 124 encloses the field-of-view of the user 150. In such implementations, the electronic device 124 presents the CGR environment by displaying data corresponding to the CGR environment on the one or more displays or by projecting data corresponding to the CGR environment onto the retinas of the user 150.

In some implementations, the electronic device 124 includes an integrated display (e.g., a built-in display) that displays the CGR environment. In some implementations, the electronic device 124 includes a head-mountable enclosure. In various implementations, the head-mountable enclosure includes an attachment region to which another device with a display can be attached. For example, in some implementations, the electronic device 124 can be attached to the head-mountable enclosure. In various implementations, the head-mountable enclosure is shaped to form a receptacle for receiving another device that includes a display (e.g., the electronic device 124). For example, in some implementations, the electronic device 124 slides/snaps into or otherwise attaches to the head-mountable enclosure. In some implementations, the display of the device attached to the head-mountable enclosure presents (e.g., displays) the CGR environment. In some implementations, the electronic device 124 is replaced with a CGR chamber, enclosure, or room configured to present CGR content in which the user 150 does not wear the electronic device 124.

In some implementations, the controller 102 and/or the electronic device 124 cause a CGR representation of the user 150 to move within the CGR environment based on movement information (e.g., body pose data, eye tracking data, hand tracking data, etc.) from the electronic device 124 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 102 and/or the electronic device 124 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like.

Figure 2:
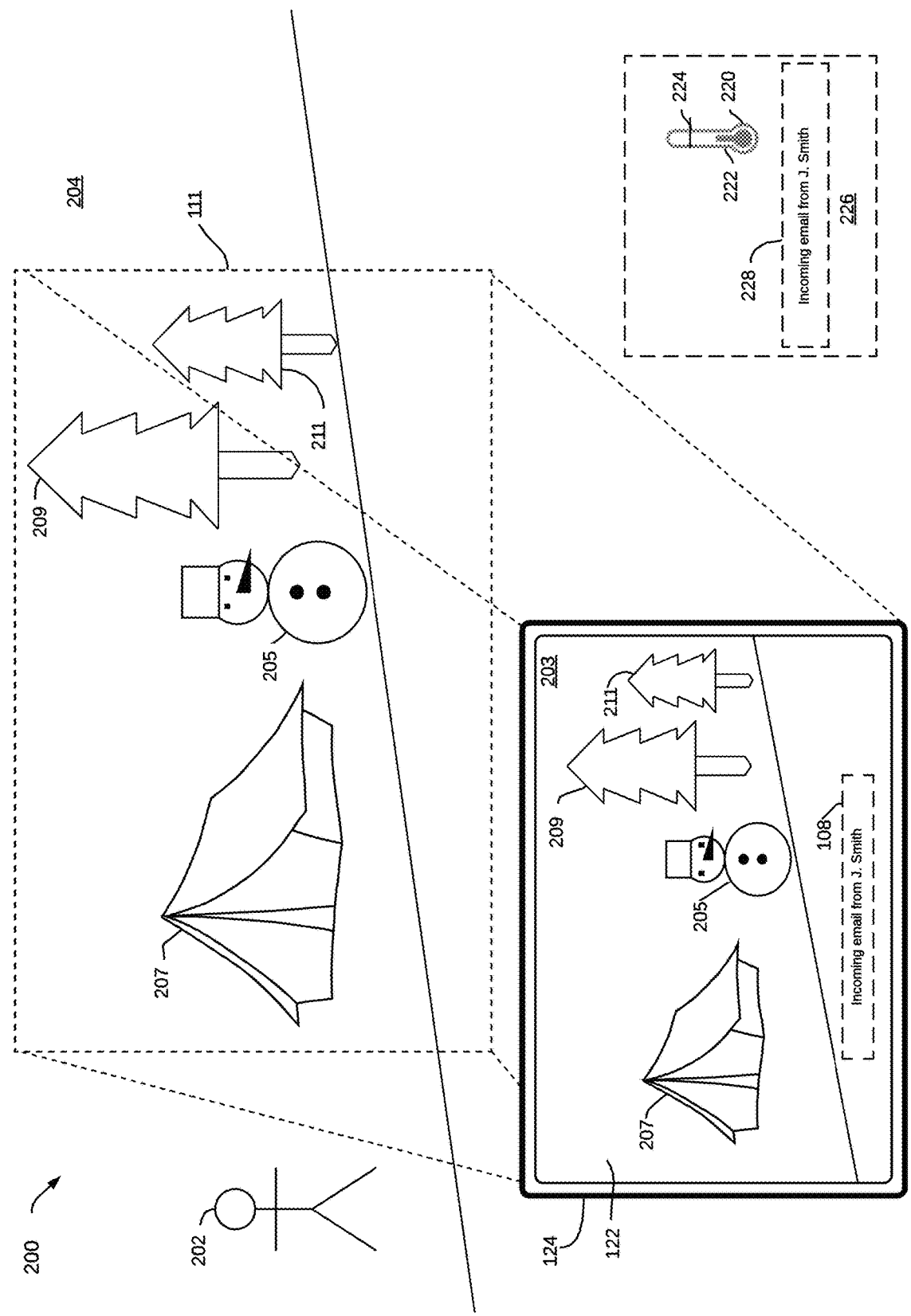
FIG. 2 is an example presentation scenario for determining a visual appearance of a UI element overlaid on an underlying physical environment in accordance with some implementations.

FIG. 2 is an example presentation scenario 200 for determining a visual appearance of a UI element 108 overlaid on an underlying physical environment 204 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. As shown in FIG. 2, the device 124 does not modify the UI element 108 from a default UI display appearance 228 because a prominence-display value 222 for the UI element 108 does not satisfy a prominence criterion 224 (e.g., a predefined or deterministic value). As such, for example, the UI element 108 is considered non-critical and the device 124 displays the UI element 108 with low visual prominence.

As shown in FIG. 2, the presentation scenario 200 includes a person 202, a snowman 205, a tent 207, and trees 209, 211 within a physical environment 204. In this example, the field-of-view 111 of the device 124 is associated with an external-facing image sensor of the device 124. In other words, while holding the device 124, the user is looking at the snowman 205, the tent 207, and the trees 209, 211 from a side or perspective orientation through the device 124. As such, the device 124 presents, via the display 122 (e.g., a live video stream or video pass-through of the physical environment 204), a user interface 203 including the UI element 108 overlaid on a portion of the physical environment 204 associated with the field-of-view 111 that includes the snowman 205, the tent 207, and the trees 209, 211.

In some implementations, where the field-of-view of a user is enclosed, the device 124 is configured to enable video pass-through of the physical environment 204 including the snowman 205, the tent 207, and the trees 209, 211 on the display 122 and to present the user interface 203 on the display 122. In some implementations, the display 122 corresponds to an additive display that enables optical-see through of the physical environment 204 including the snowman 205, the tent 207, and the trees 209, 211. For example, the display 122 corresponds to a transparent lens, and the device 124 corresponds to a pair of glasses worn by the user. In some implementations, the device 124 presents the user interface 203 by projecting the UI element 108 onto the additive display, which is, in turn overlaid on the physical environment 204 from the perspective of the user. In some implementations, the device 124 presents the user interface 203 by rendering the UI element 108 on the additive display, which is also, in turn overlaid on the physical environment 204 from the perspective of the user.

As an example, provided for reference and to illustrate attributes and values associated with a particular UI element, UI display status information 226 includes a default UI display appearance 228 for the particular UI element and a prominence-display status 220. In some implementations, the prominence-display status 220 shows the prominence-display value 222 and the prominence criterion 224 (e.g., a predefined or deterministic value) for the particular UI element. In some implementations, the default UI display appearance 228 displays a default visual appearance of particular UI element (e.g., the UI element 108) without modifications to the visual characteristics of the particular UI element.

As shown in FIG. 2, the default UI display appearance 228 for an email notification consists of black text displaying "Incoming email from J. Smith" against a white background. Those of ordinary skill in the art will appreciate that the UI display status information 226 includes merely the basic features typically available for the UI element 108. So, while some specific features are illustrated, those of ordinary skill in the art will appreciate from the present disclosure that various features have not been illustrated for the sake of brevity and so as not to obscure the more pertinent aspects of the UI display status information 226.

In some implementations, a developer or an owner of the UI element sets the prominence-display value 222 for the UI element 108 while the prominence criterion 224 is deterministic. For example, the prominence criterion 224 may be based on current user activities, sensor information (physiological user measurements, body pose, velocity, acceleration, etc.), proximity to objects recognized in the physical environment, and/or the like.

In some implementations, the developer or the owner of the UI element sets the prominence criterion 224 while the prominence-display value 222 for the UI element 108 is deterministic. For example, the prominence-display value 222 for the UI element 108 may be based on current user activities, sensor information (physiological user measurements, body pose, velocity, acceleration, etc.), proximity to objects recognized in the physical environment, and/or the like.

As shown in FIG. 2, the prominence-display value 222 does not satisfy the prominence criterion 224. As such, the device 124 or a controller (e.g., the controller 102 shown in FIGS. 1 and 9) does not modify any visual characteristics of the UI element 108 and displays the UI element 108 according to the default UI display appearance 228. To that end, as shown in FIG. 2, the default UI display appearance 228 of the UI element 108 appears to blend in with the snowy landscape associated with the physical environment 204 because of the white background and small black text. However, this may be appropriate because the developer or the owner of the UI element 108 considers UI elements for email notifications to be non-critical and/or of low importance due to a variety of reasons.

Figure 3:
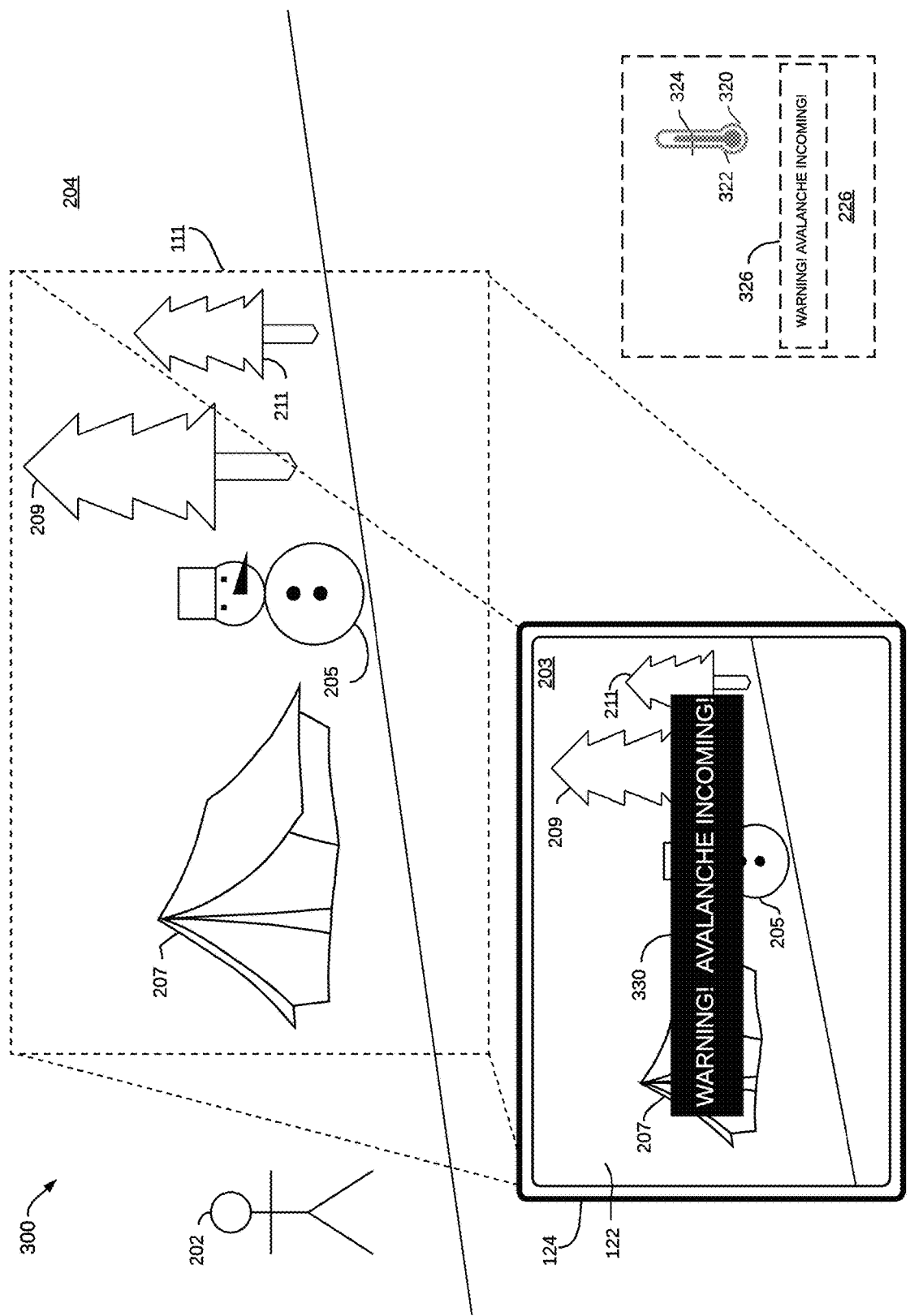
FIG. 3 is another example presentation scenario for determining a visual appearance of a UI element overlaid on an underlying physical environment in accordance with some implementations.

FIG. 3 is another example presentation scenario 300 for determining a visual appearance of a UI element 330 overlaid on an underlying physical environment 204 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. As shown in FIG. 3, a prominence-display value 322 for the UI element 330 satisfies a prominence criterion 324 (e.g., a predefined or deterministic value). As such, the UI element 330 is considered critical and the device 124 displays the UI element 330 with high visual prominence. To that end, the device 124 modifies the visual characteristics of the UI element 330 from a default UI display appearance 326. This contrasts with FIG. 2 where the device 124 does not modify the visual characteristics of the UI element 108 from a default UI display appearance 228 because the prominence-display value 222 does not satisfy the prominence criterion 224.

As shown in FIG. 3, the developer or the owner of the UI element 330 considers the UI element 330 to be critical and/or of high importance. As shown by the prominence-display status 320, the developer or the owner of the UI element 330 sets the prominence-display value 322 to a value that satisfies the prominence criterion 324. The prominence-display status 320 indicates that it is not appropriate for the UI element 330 to blend into the physical environment 204. Instead, the device 124 should display the UI element 330 prominently when overlaid on the physical environment 204. In response to determining that the prominence-display value 322 satisfies the prominence criterion 324, the device 124 or the controller modifies one or more visual characteristics of the UI element 330 based on the environmental characteristics of the physical environment 204 in order to allow the UI element 330 to stand out against the physical environment 204.

In some implementations, the device 124 determines environmental characteristics of the physical environment 204 such as the visual characteristic of the physical environment 204 (e.g., color, saturation, etc.), lighting characteristics of the physical environment 204, objects in the physical environment 204, and/or the like. As shown in FIG. 3, the physical environment 204 includes a person 202, a tent 207, a snowman 205, and trees 209, 211 against a white snowy background. To that end, the device 124 modifies the visual characteristics of the UI element 330 from a default UI display appearance 326 of black text displaying "WARNING! AVALANCHE INCOMING!" against a white background to white text displaying "WARNING! AVALANCHE INCOMING!" against a black background. In addition, the device 124 also modifies the size of the UI element 330 to be larger than the default UI display appearance 326. Furthermore, the device 124 places the UI element 330 directly in the middle of the screen such that the device 124 displays the UI element 330 more prominently via the display 122 of the device 124. In this example, the modified visual characteristics of the UI element 330 creates a high level of contrast against the physical environment 204 such that the UI element 330 is easily identified when overlaid on the physical environment 204. Those of ordinary skill in the art will appreciate that there are many methods of modifying visual characteristics of a UI element based on the environmental characteristics of the physical environment. For the sake of brevity, an exhaustive listing of all such methods is not provided herein.

Displaying or projecting UI elements on an additive display introduces another layer of difficulty because the device 124 and/or the controller 102 can add light to the field-of-view of the user but cannot subtract light to the field-of-view of the user. For example, the device 124 and/or the controller 102 can display UI elements with black text or a black background when the additive displays includes a dimmable layer. In another example, the device 124 and/or the controller can display UI elements with colors other than black (e.g., red, green, blue, or a suitable combination thereof) text or background on an additive display without the dimmable layer. Thus, being able to abstract away the details of how to make the UI element stand out for any given background simplifies the experience for a developer of the UI element.

Figure 4:
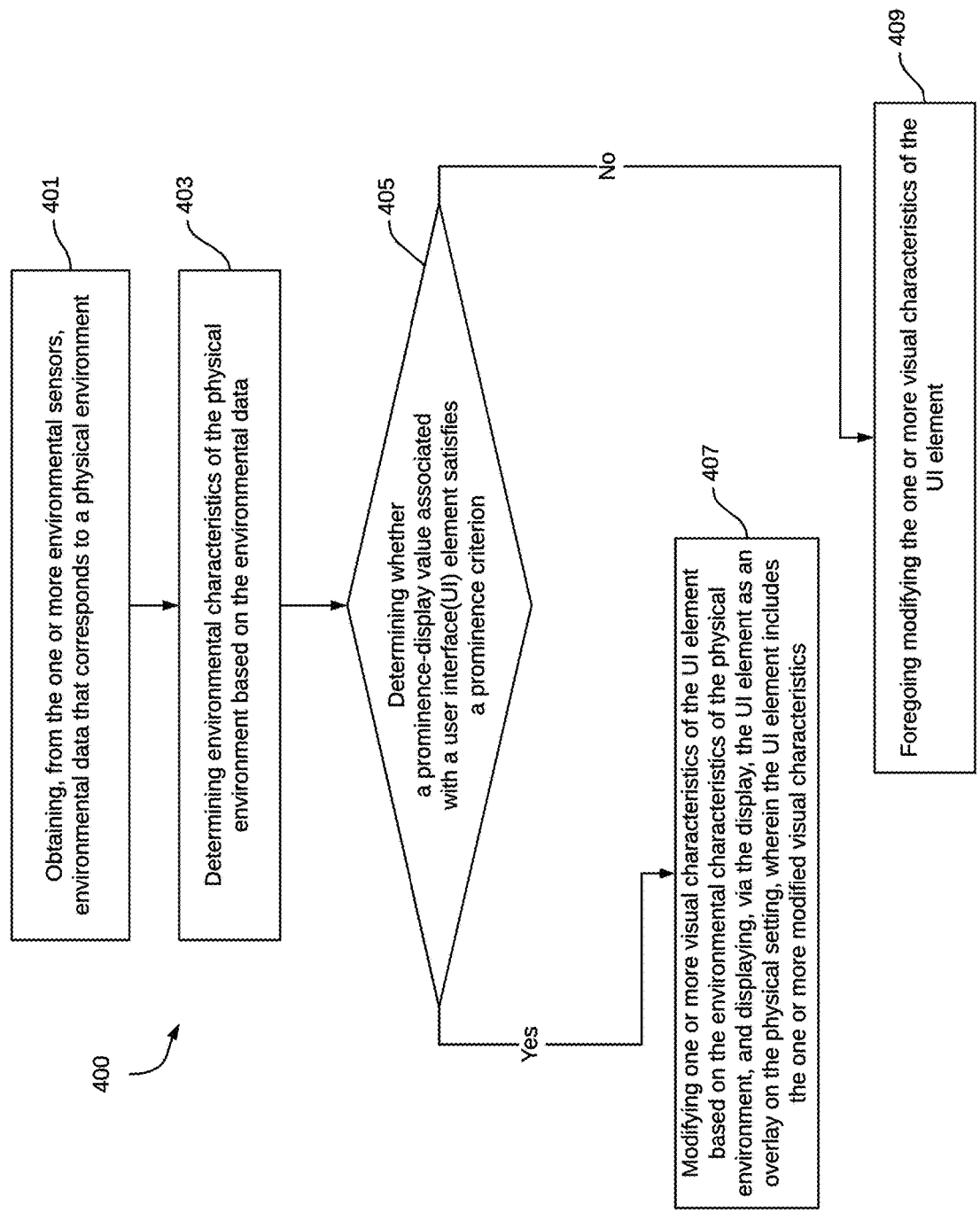
FIG. 4 is a flowchart representation of a method of determining a visual appearance of a UI element overlaid on an underlying physical environment based on a prominence-display value and environmental characteristics of the underlying physical environment in accordance with some implementations.

FIG. 4 is a flowchart representation of a method 400 of determining a visual appearance of a UI element overlaid on an underlying physical environment based on a prominence-display value and environmental characteristics of the underlying physical environment in accordance with some implementations. In various implementations, the method 400 is performed at a device (e.g., the device 124 shown in FIGS. 1 and 10; the controller 102 in FIGS. 1 and 9; or a suitable combination thereof) with one or more environmental sensors, one or more processors, a non-transitory memory, and a display. In some implementations, the method 400 is performed by processing logic, including hardware, firmware, software, or a combination thereof. In some implementations, the method 400 is performed by a processor executing code stored in a non-transitory computer-readable medium (e.g., a memory).

Figure 5A:
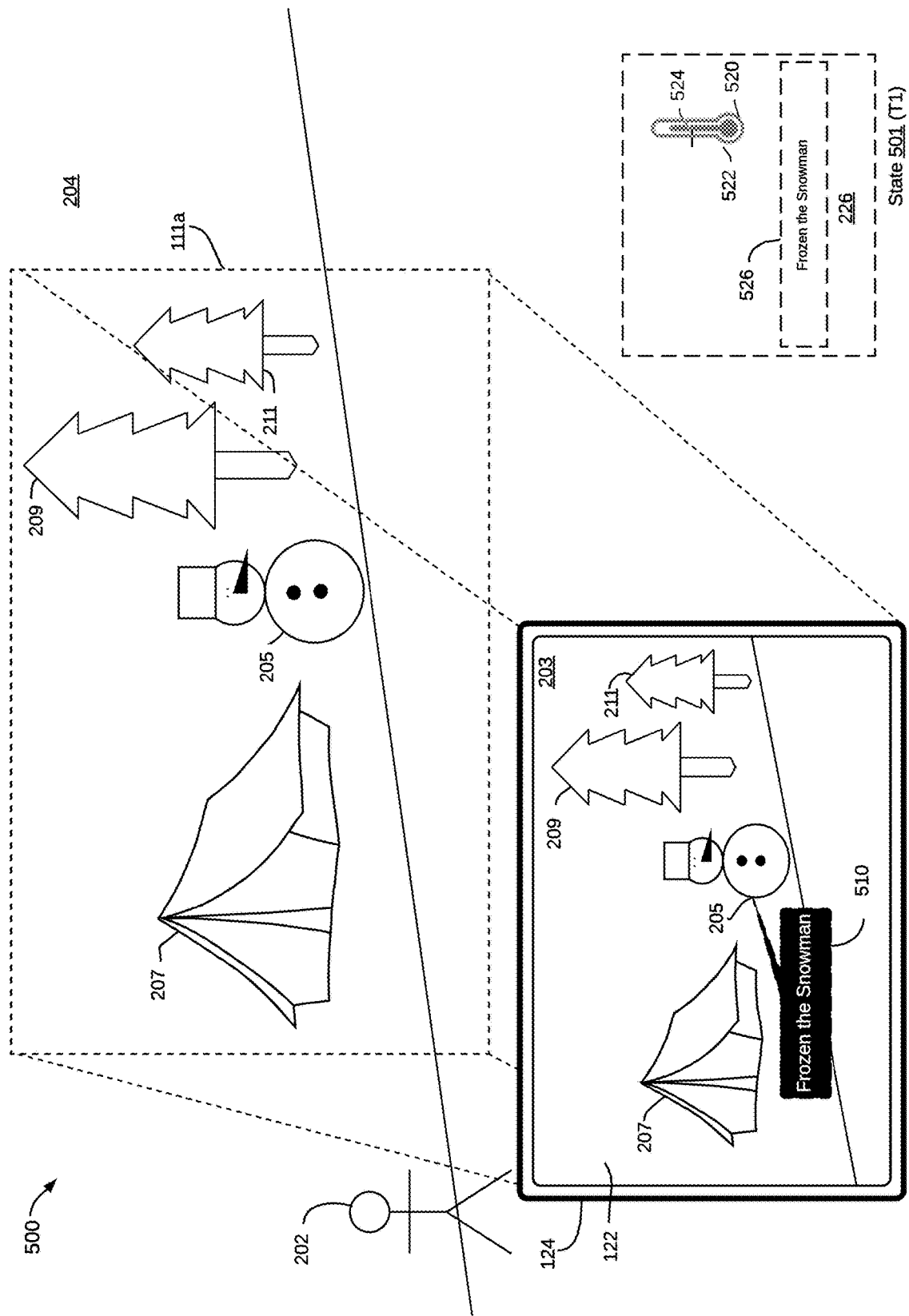
Figure 5B:
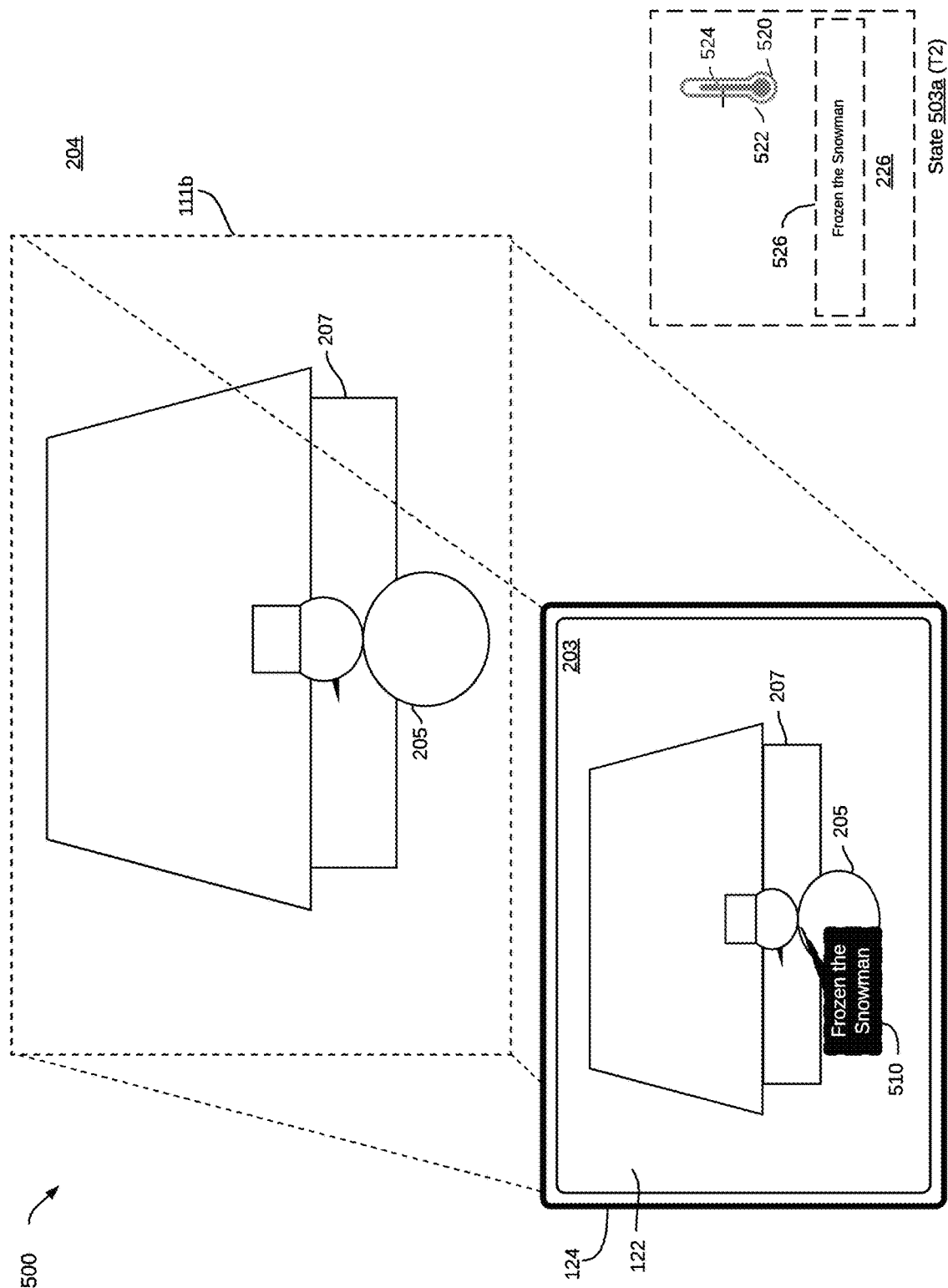
Figure 5D:
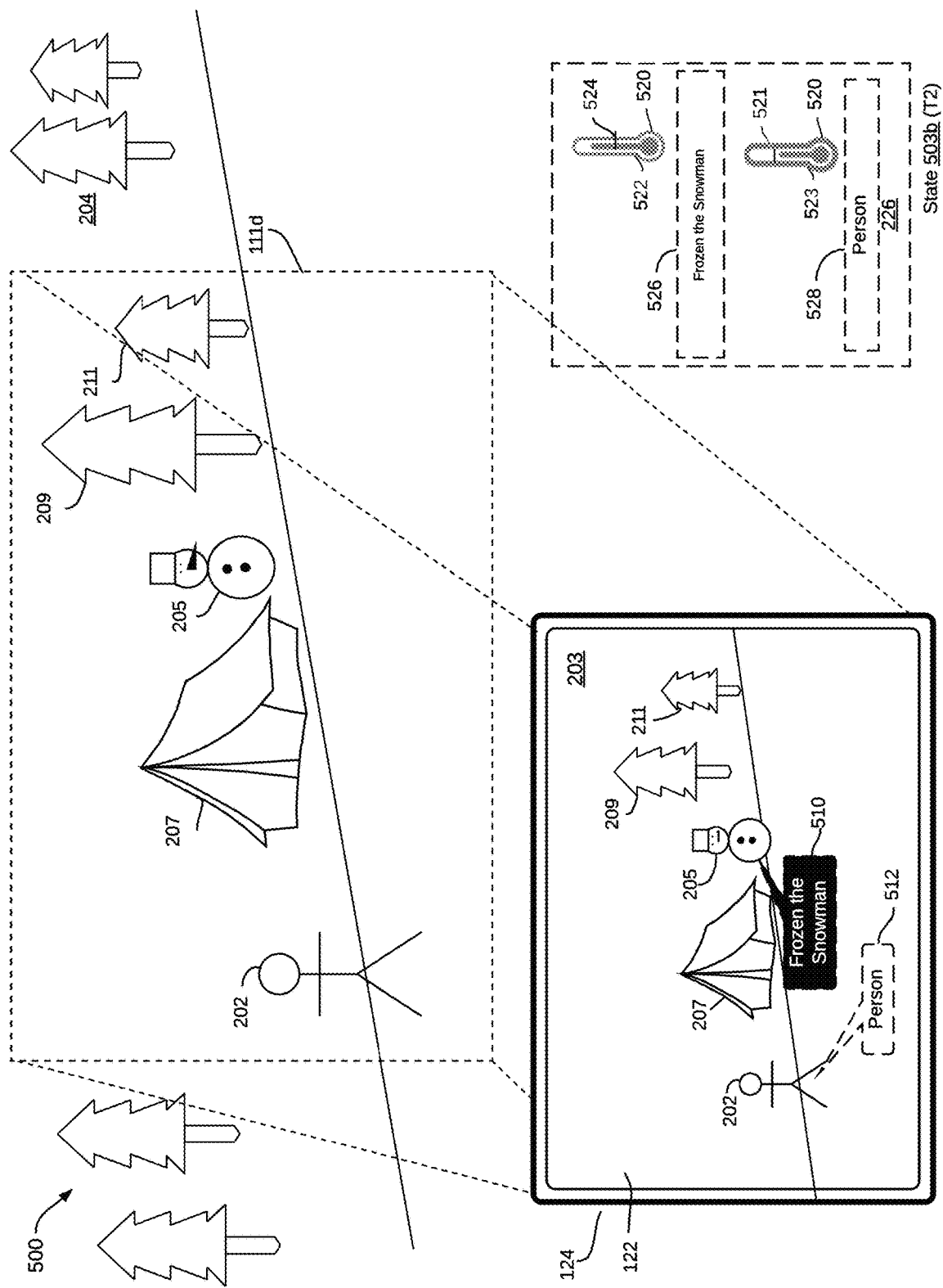
Figure 5E:
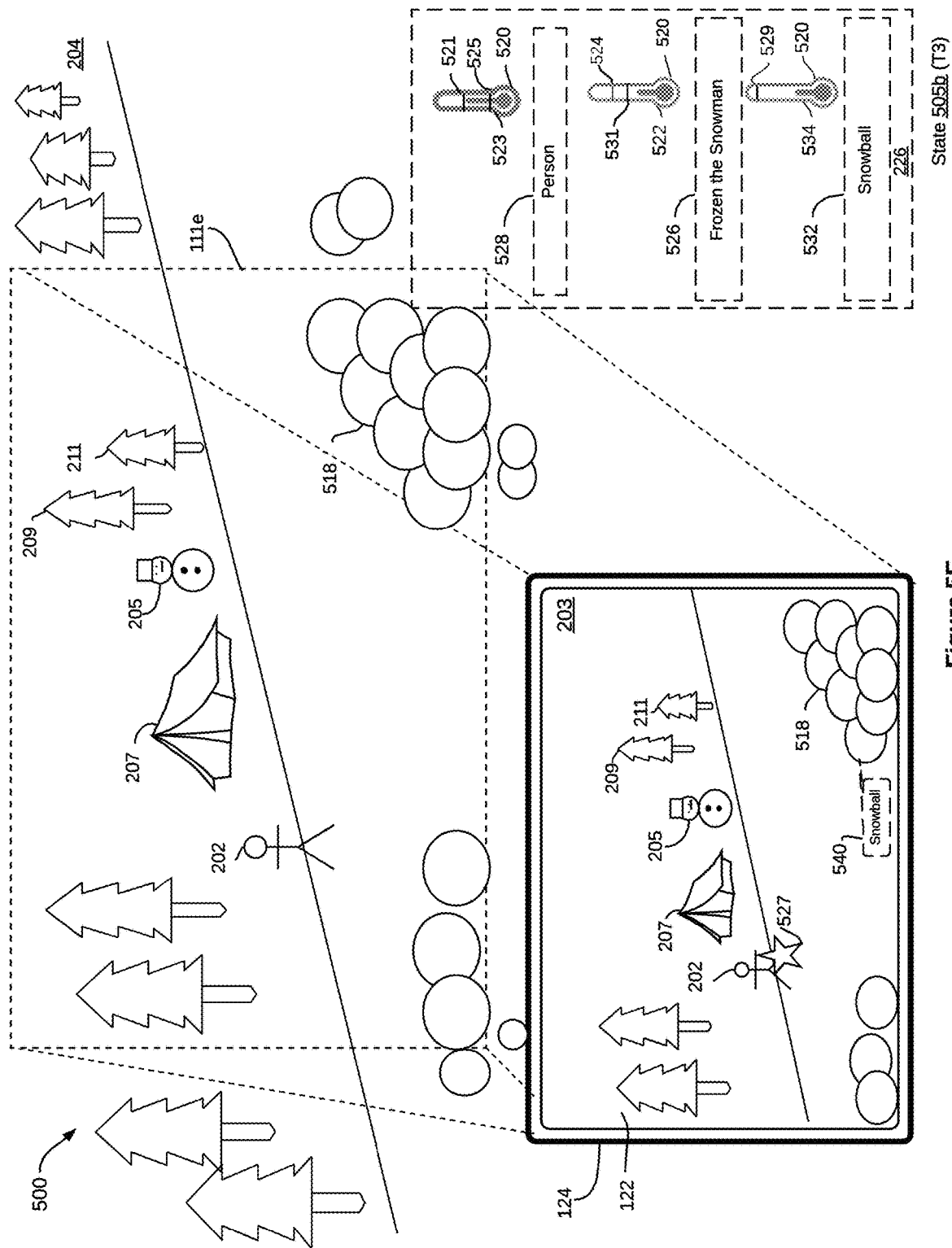
Figure 6A:
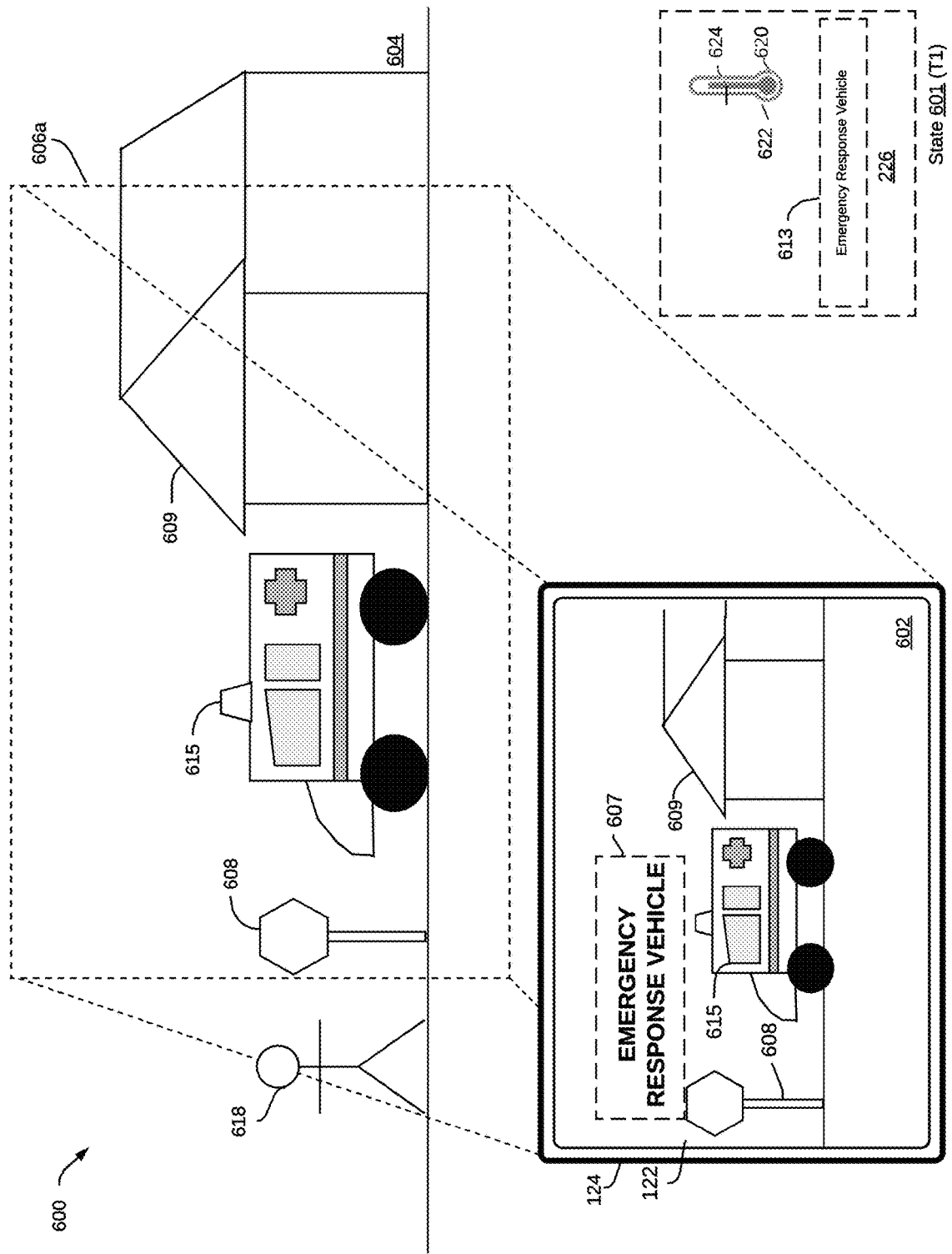
FIGS. 6A-6C illustrate an example presentation scenario sequence for maintaining a visual display of a UI element in accordance with some implementations.
Figure 6B:
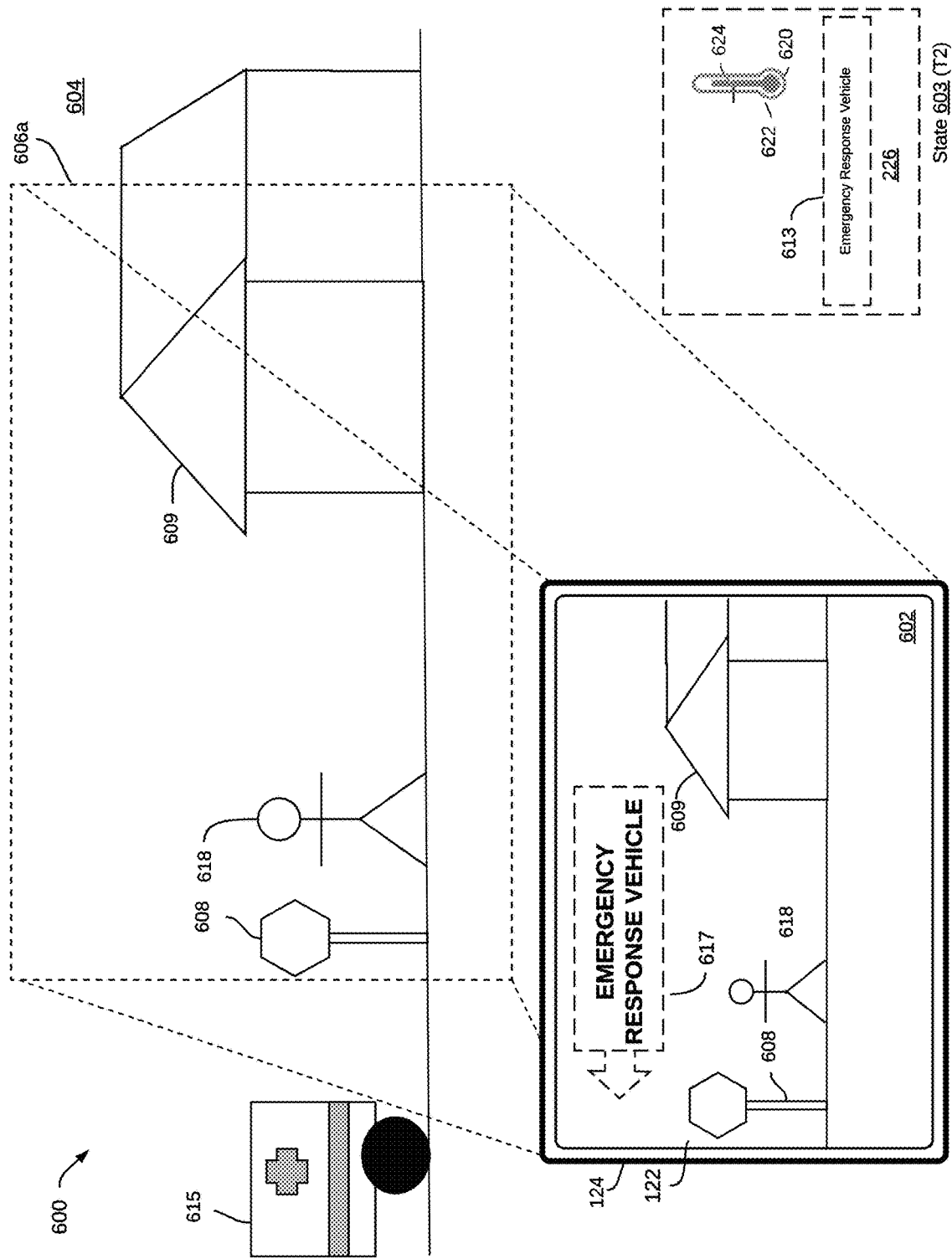
Figure 6C:
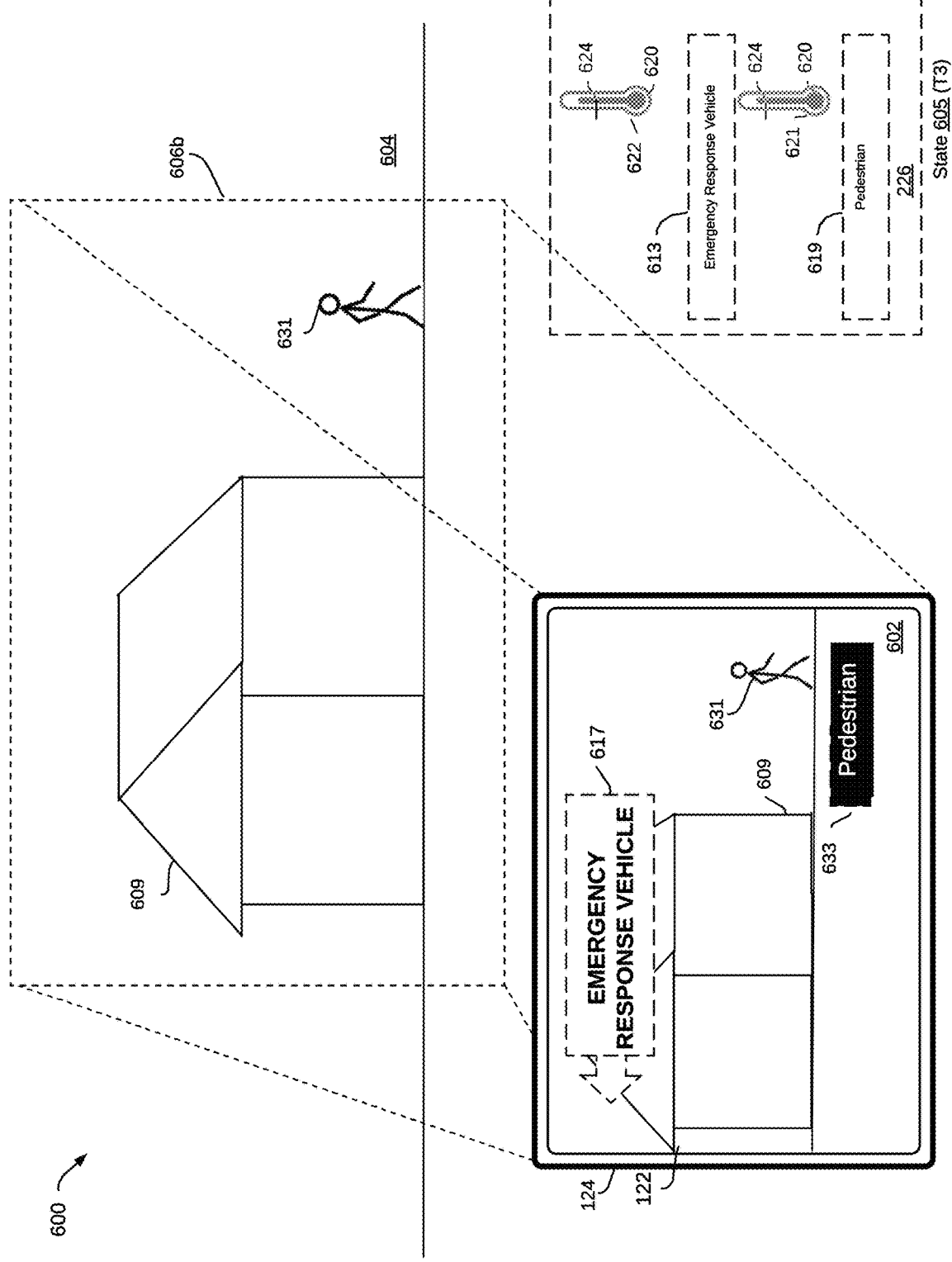
Figure 7A:
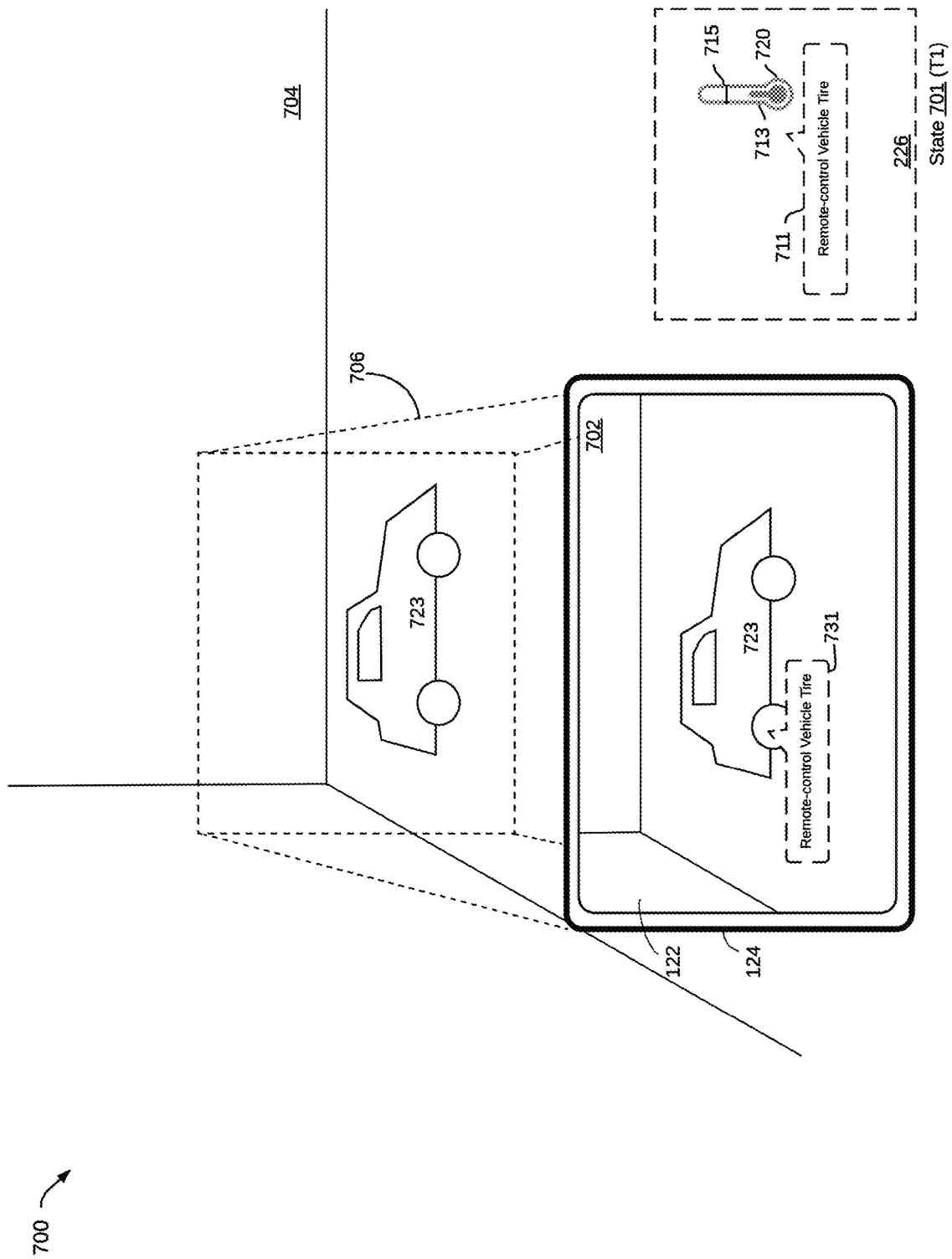
FIGS. 7A and 7B illustrate an example presentation scenario sequence for not maintaining a visual display of a UI element in accordance with some implementations.
Figure 7B:
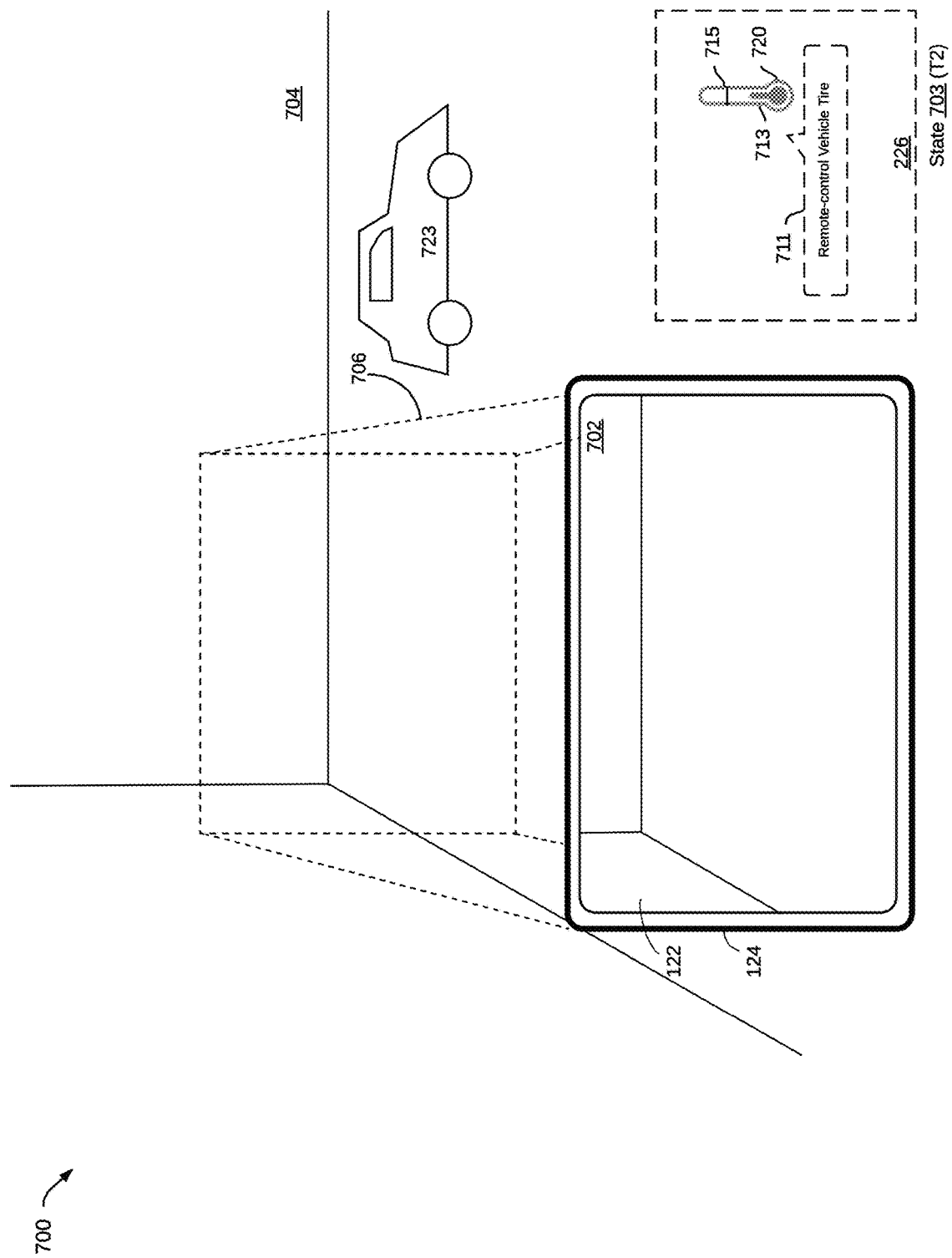

As represented by block 401, the method 400 includes obtaining, from the one or more environmental sensors, environmental data that corresponds to a physical environment (e.g., the physical environment 105 shown in FIG. 1, the physical environment 204 shown in FIGS. 2, 3, 5A-5E, the physical environment 604 shown in FIGS. 6A-6C, or the physical environment 704 shown in FIGS. 7A and 7B). In some implementations, the environmental data correspond to video pass-through or other optical information associated with the physical environment such that the one or more environmental sensors includes at least an image sensor that captures image data. In some implementations, the environmental data correspond to light data such that the one or more environmental sensors includes at least an illumination sensor that detects lighting conditions. In some implementations, the environmental data correspond to audio data such that the one or more environmental sensors includes at least one or more microphones that detects audio data.

As represented by block 403, the method 400 includes determining environmental characteristics of the physical environment based at least in part on the environmental data. In some implementations, the environmental data corresponds to image data associated with the field-of-view of the device, wherein the UI element is overlaid onto the image data. In some implementations, the device 124 captures the image data with an exterior-facing image sensor. In some implementations, the image sensor corresponds to an RGB camera (complementary-metal-oxide semiconductor (CMOS)) or charge-coupled device (CCD)). In some implementations, the image sensor corresponds to an external-facing image sensor on a tablet, a mobile phone, a near-eye system, or the like. In some implementations, the device determines environmental characteristics of the physical environment within the image data by performing semantic segmentation or instance segmentation. In some implementations, semantic segmentation corresponds to detecting and labeling objects that appear within image data. In some implementations, instance segmentation corresponds to detecting and delineating distinct objects that appear within the image data. In some implementations, the environmental characteristics correspond to lighting characteristics of the physical environment, background color of the physical environment, objects in the physical environment, shadows of the physical environment, and/or the like. Those of ordinary skill in the art will appreciate that there are many environmental characteristics within a physical background. For the sake of brevity, an exhaustive listing of all such characteristics is not provided herein.

As represented by block 405, the method 400 includes determining whether a prominence-display value associated with a UI element satisfies a prominence criterion in response to obtaining a request to display the UI element on the display. In some implementations, the prominence criterion corresponds to a numerical value (e.g., predefined or deterministic). In some implementations, the prominence criterion corresponds to different prominence threshold categories such as a low prominence threshold category, a medium prominence threshold category, or a high prominence threshold category. In some implementations, the prominence-display value for the UI element corresponds to a level of criticality or importance of the UI element. In some implementations, the prominence-display value is preset by the developer or the owner of the UI element through an API. In some implementations, the device modifies one or more visual characteristics of the UI element when the prominence-display value satisfies a preset or deterministic prominence criterion. For example, the prominence-display value may be based on current user activities, sensor information (physiological user measurements, body pose, velocity, acceleration, etc.), proximity to objects recognized in the physical environment, and/or the like.

In some implementations, the UI element corresponds to a menu window, a warning indicator, a tool tip, a message box, an affordance such as a button, a notification, an icon, or the like. For example, as shown in FIG. 2, the UI element 108 corresponds to a pop-up notification for an incoming electronic mail. As another example, as shown in FIG. 3, the UI element 330 corresponds to a warning indicator. Those of ordinary skill in the art will appreciate that there are many different types of UI elements. For the sake of brevity, an exhaustive listing of all such UI elements is not provided herein.

If the prominence-display value associated with the UI element satisfies the prominence criterion ("Yes" path from block 405), as represented by block 407, the method 400 includes modifying one or more visual characteristics of the UI element based on the environmental characteristics of the physical environment, and displaying, via the display, the UI element as an overlay on the physical environment, wherein the UI element includes the one or more modified visual characteristics.

In some implementations, the device modifies the one or more visual characteristics of the UI element based at least in part on all the pixels in the field-of-view of the device. In some implementations, the device modifies the one or more visual characteristics of the UI element based at least in part on the pixels in the field-of-view of the device over which the UI element will be placed. In some implementations, the device modifies the one or more visual characteristics of the UI element based at least in part on the pixels that are adjacent to the pixels in the field-of-view of the device over which the UI element will be covered. In some implementations, modifying the one or more visual characteristics of the UI element includes modifying at least one of a brightness of the UI element, a background color of the UI element, a text color associated with the UI element, a text size associated with the UI element, a text font associated with the UI element, text alignment associated with the UI element, a text capitalization scheme associated with the UI element, a text emphasis associated with the UI element such as boldface or italics, a UI element size, rotational coordinates for the UI element within an image space defined by the user interface, translational coordinates for the UI element within an image space defined by the user interface, a UI element border color, a UI element border thickness, a UI element border treatment such as dashes, a UI element shadow, a UI element opacity/translucency value, a UI element shape, a dimensionality of the UI element such as 2D to 3D, a UI element animation such as a blinking animation, replacing the UI element with an indicator, and/or the like of the UI element. For example, as shown in FIG. 3, the device 124 or the controller modifies the UI element 330 by changing the size and color of the text from a default UI display appearance 326 in order to more prominently display the UI element 330 as an overlay on the physical environment 204. As another example, the device 124 or the controller modifies the color of the UI element 330 from a default UI display appearance 326 in order to set a contrast level between the underlying content in the physical environment 204 and the UI element—which in turn improves readability of the UI element.

In some implementations, modifying the one or more visual characteristics of the UI element may include determining a location to display the UI element based on the visual characteristics of the physical environment. For example, as shown in FIG. 3, the device 124 places the UI element 330 in the middle of the display 122 of the device 124 so that the user may more easily see the UI element 330 overlaid on the physical environment 204. In some implementations, modifying the one or more visual characteristics of the UI element is based at least in part on user accessibility parameters. For example, if a user is colorblind, the device modifies the UI element based on a particular set of colors that the user can distinguish. As another example, if a user is vision-impaired and prefers large font size, the device modifies the UI element by increasing the font size. As yet another example, if the user is right-handed or tends to gaze in a certain direction, the device displays the UI element in a particular location based thereon. Those of ordinary skill in the art will appreciate that there are many different ways of modifying the one or more visual characteristics of a UI element. For the sake of brevity, an exhaustive listing of all such modifications is not provided herein.

In some implementations, if the prominence-display value associated with the UI element satisfies the prominence criterion, the device may output audio that is related or unrelated to the UI element. For example, referring back to FIG. 3, the device 124 may produce an audible alarm in order to alert the user of the avalanche warning. In some implementations, if the prominence-display value associated with the UI element satisfies the prominence criterion, the device may also generate haptic output. As another example, referring back to FIG. 3, the device 124 may generate the haptic output by vibrating the device 124 in order to alert the user of the avalanche warning.

If the prominence-display value associated with the UI element does not satisfy the prominence criterion ("No" path from block 405), as represented by block 409, the method 400 includes foregoing modifying the one or more visual characteristics of the UI element. For example, as shown in FIG. 2, the prominence-display value 222 for the UI element 108 does not satisfy the prominence criterion 224. As such, continuing with the example in FIG. 2, the device 124 does not modify visual characteristics of the UI element 108 and, instead, displays the UI element 108 with the default UI display appearance 228 as an overlay on the physical environment 204.

In some implementations, the method 400 further includes obtaining an object-specific flag for the UI element, wherein the object-specific flag corresponds to a particular object; and in response to determining that at least one instance of the particular object is present within environmental data, displaying the UI element in visual proximity to the particular object in the physical environment. According to some implementations, visual proximity is defined relative to an image space associated with optical see-through incident to the user interface associated with the additive display or an image space defined by the pass-through image data. In some implementations, the UI element may be anchored near or over a view of the particular object that is detected in the physical environment. The features and components involved in anchoring a UI element proximate to the particular object in the physical environment are discussed in greater detail below with respect to FIGS. 5A-5E, 6A-6C, and 7A. In some implementations, if at least one instance of the particular object is not detected within the environmental data, the device foregoes presenting the UI element associated with the particular object in the physical environment.

In some implementations, the method 400 further includes determining whether the physical environment includes two or more instances of the same object, and in response to determining that the physical environment includes two or more instances of the same object, displaying the UI element proximate to a single instance of the object from among the two or more instances of the same object. In some implementations, the device displays the UI element proximate to or over the single instance of the object from among the two or more instances of the same object in response to determining that the physical environment includes the two or more instances of the particular object. In some implementations, the device selects the single instance of the object from among the two or more instances of the same object by choosing the instance of the object that is located closest to the middle of the field-of-view of the device. In some implementations, the device selects the single instance of the object from among the two or more instances of the same object by selecting the single instance of the object that is located closest to the device. In some implementations, the device selects the single instance of the object from among the two or more instances of the same object at random. The features and components involved in a de-duplication operation of a UI element for multiple instances of an object are discussed in greater detail below with respect to FIGS. 5E and 7A.

In some implementations, the method 400 further includes modifying the one or more visual characteristics based at least in part on maintaining a visual attribute of the UI element (e.g., based on digital-rights management (DRM) limitations associated with the UI element). In some implementations, the visual attribute corresponds to at least one of a color, geometric shape, texture, size, or the like. For example, a particular characteristic of the UI element may be preserved based on maintaining a developer's intent for the UI element such as a particular trademarked shape or color. In some implementations, maintaining the visual attribute of the UI element includes modifying at least one visual characteristic of the UI element to contrast with the physical environment. For example, if the developer insists on keeping the UI element a certain color, the device may generate a contrasting border around the UI element in order to keep the UI element the same color while keeping the UI element from blending in with the physical environment.

In some implementations, the method 400 further includes modifying the one or more visual characteristics of the UI element based at least in part on user accessibility parameters. For example, if a user is colorblind, the device modifies colors of the UI element based on a particular set of colors that the user can distinguish. As another example, if a user is vision-impaired and prefers large font size, the device modifies the UI element by increasing the font size. As yet another example, if the user is right-handed or tends to gaze in a certain direction, the device modifies the UI element by placing the UI element in a particular location based thereon.

In some implementations, the method 400 includes determining a body pose vector of the user of the device and modifying the one or more visual characteristics of the UI element based at least in part on the body pose vector of the user and the environmental characteristics of the physical environment. In some implementations, the device uses sensor information from the one or more I/O devices and sensors of the device, such as an accelerometer or gyroscope, in order to determine the body pose vector of the user of the device. In some implementations, the device uses sensor information from one or more remote input devices (e.g., the optional remote input devices) in order to determine the body pose vector of the user of the device. In some implementations, the method includes predicting a future body pose vector of the user of the device and modifying the one or more visual characteristics of the UI element based at least in part on the future body pose vector of the user and the environmental characteristics of the physical environment. As an example, the body pose vector can be used as an input for user accessibility parameters such as the handedness of the user, height of the user, and/or the like. For example, in some implementations, the body pose vector may indicate one or more pose characteristics of the user (e.g., rotational and/or translational coordinates for each joint, limb, and/or body portion), an overall pose of the user (e.g., sitting, standing, crouching, etc.), a head pose of the user, and hand tracking information associated with the hands of the user. Those of ordinary skill in the art will appreciate from the present disclosure that the body pose vector is a non-limiting example and that the body pose vector may include other sub-divisions, identifiers, and/or portions in various implementations.

In some implementations, the method 400 further includes determining a gaze direction of a user of the device and modifying the one or more visual characteristics of the UI element based at least in part on the gaze direction of the user of the device and the environmental characteristics of the physical environment. In some implementations, the method includes predicting a future gaze direction of the user of the device and modifying the one or more visual characteristics of the UI element based at least in part on the future gaze direction of the user of the device and the environmental characteristics of the physical environment. For example, the device may use the gaze direction as an input for user accessibility parameter such that if a user tends to gaze in a particular direction, the device re-positions critical UI elements based on that particular direction. In some implementations, the device uses a gaze sensor to determine the gaze direction of the user of the device.

FIGS. 5A-5E illustrate example presentation scenario 500 sequences for maintaining visual display of a UI element in accordance with some implementations. While pertinent features are shown, those of ordinary skill in art will appreciate from the present disclosure that various other features have not been illustrated for the sake of brevity and so as not to obscure more pertinent aspects of the example implementations disclosed herein.

The sequence shown in FIGS. 5A-5C depicts the field-of-view of the device 124 changing due to translational movement of the device 124. In the sequence shown in FIGS. 5A-5C, the field-of-view of the device 124 changes from a field-of-view 111a at time T1 in FIG. 5A to a field-of-view 111b at time T2 in FIG. 5B and again to a field-of-view 111c at time T3 in FIG. 5C.

FIG. 5A illustrates a first state 501 (e.g., associated with T1 or a first time period) of an example presentation scenario 500. In the first state 501, at least a portion of the physical environment 204 is within the field-of-view 111a of an external-facing image sensor of the device 124. As shown in FIG. 5A, the physical environment 204 includes the person 202, the tent 207, the snowman 205, and the trees 209, 211. As such, in FIG. 5A, the device 124 displays, on the display 122, the user interface 203 including the tent 207, the snowman 205, and trees 209, 211. In this example, the user interface 203 does not include the person 202 because the person 202 is outside of the field-of-view 111a of the device 124.

In some implementations, where the field-of-view of a user is enclosed, the device 124 is configured to enable video pass-through of the physical environment 204 including the snowman 205, the tent 207, and the trees 209, 211 on the display 122 and to present the user interface 203 on the display 122. In some implementations, the display 122 corresponds to an additive display that enables optical-see through of the physical environment 204 including the snowman 205, the tent 207, and the trees 209, 211. For example, the display 122 corresponds to a transparent lens, and the device 124 corresponds to a pair of glasses worn by the user. In some implementations, the device 124 presents the user interface 203 by projecting the UI element 108 onto the additive display, which is, in turn overlaid on the physical environment 204 from the perspective of the user. In some implementations, the device 124 presents the user interface 203 by rendering the UI element 108 on the additive display, which is also, in turn overlaid on the physical environment 204 from the perspective of the user.

As shown in FIG. 5A, the UI display status information 226 for the UI element 510 associated with the snowman 205 includes the prominence-display status 520 and a default UI display appearance 526. In this example, a prominence-display value 522 associated with the UI element 510 for the snowman 205 satisfies a prominence criterion 524 (e.g., a predefined or deterministic value). Accordingly, the device 124 modifies the visual characteristics of the UI element 510 based on the environmental characteristics of the physical environment 204. As shown in FIG. 5A, the device 124 or the controller (e.g., the controller 102 shown in FIGS. 1 and 9) modifies the one or more visual characteristics of the UI element 510 from the default UI display appearance 526 of black text against a white background to white text against a black background in order to increase contrast against the snowy landscape associated with the physical environment 204. In some implementations, the device 124 or the controller can render a UI element with black text or black background when the additive displays includes a dimmable layer in order to create contrast between the UI element and the underlying content in the physical environment. In some implementations, the device 124 or the controller can render a UI element with colors other than black (e.g., red, green, blue, or a suitable combination thereof) text or background on an additive display without the dimmable layer in order to create contrast between the UI element and the underlying content in the physical environment. The modified visual characteristics of the UI element 510 enable the UI element 510 to be more visually prominent when overlaid on the physical environment 204.

In this example, the device 124 obtains an object-specific flag for the UI element 510 associated with the snowman 205. To that end, the device 124 or the controller 102 identifies the snowman 205 within the image data associated with the field-of-view 111a according to instance segmentation, semantic segmentation, and/or other computer vision techniques. In some implementations, the device 124 or the controller 102 identifies a plurality of objects within the image data. In some implementations, the UI element 510 is selected from a library of UI elements for a current application or plug-in because the device 124 or the controller 102 identifies the snowman 205 associated with the UI element 510 within the image data. As such, in response to determining that the snowman 205 is present within the image data, the device 124 presents the UI element 510 as an overlay proximate to the snowman 205 in the physical environment 204. In contrast, UI elements are not provided for the tent 207 and the trees 209, 211 because the library of UI elements for the current application or plug-in does not include UI elements for the tent 207 or the trees 209, 211.

FIG. 5B illustrates a second state 503a (e.g., associated with T2 or a second time period) of the example presentation scenario 500. In comparison to FIG. 5A, the field-of-view of the device 124 changes due to the device 124 moving or translating counter-clockwise within the physical environment 204 such that the device 124 now captures a side perspective of the snowman 205 and the tent 207. As shown in FIG. 5B, in the second state 503a, the field-of-view 111b of the device 124 of the physical environment 204 includes a side view of the tent 207 and a side view of the snowman 205. In some implementations, in response to detecting movement in the field-of-view of the device 124 (e.g., moving from the field-of-view 111a at time T1 in FIG. 5A to the field-of-view 111b at time T2 in FIG. 5B) and determining that the prominence-display value 522 associated with the UI element 510 satisfies the prominence criterion 524, the device 124 displays, via the display 122, the UI element 510 as an overlay on the physical environment 204 in the second state 503a. In other words, the device 124 updates the position of the UI element 510 as the view of the snowman 205 changes from the front view at time T1 in FIG. 5A to the side view at time T2 in FIG. 5B. As shown in FIG. 5B, the device 124 displays, on the display 122, a user interface 203 including the side view of the snowman 205, the side view of the tent 207, and the UI element 510 overlaid proximate to the side of the snowman 205.

FIG. 5C illustrates a third state 505a (e.g., associated with T3 or a third time period) of the example presentation scenario 500. In comparison to FIG. 5B, the field-of-view of the device 124 changes again due to the device 124 moving or translating counter-clockwise within the physical environment 204 such that the device now captures a back view of the snowman 205, a partial back view of the tent 207, and a back view of the trees 209, 211. As shown in FIG. 5C, the field-of-view 111c of the device 124 of the physical environment 204 includes the back view of the trees 209, 211, the back view of the snowman 205, and the partial back view of the tent 207. In some implementations, in response to detecting movement in the field-of-view of the device 124 (e.g., moving from the field-of-view 111b at time T2 in FIG. 5B to the field-of-view 111c at time T3 in FIG. 5C) and determining that the prominence-display value 522 for the UI element 510 satisfies the prominence criterion 524, the device 124 displays, via the display 122, the UI element 510 as an overlay on the physical environment 204. In other words, the device 124 updates the position of the UI element 510 as the view of the snowman 205 changes from the side view at time T2 in FIG. 5B to the back view at time T3 in FIG. 5C. As shown in FIG. 5C, the device 124 displays, on the display 122, the user interface 203 including the back view of the trees 209, 211, the back view of the snowman 205, the partial back view of the tent 207, and the UI element 510 overlaid proximate to the back of the snowman 205.

The sequence shown in FIGS. 5A, 5D, and 5E depicts the field-of-view of the device 124 changing due to a zoom operation of the device 124. In the sequence shown in FIGS. 5A, 5D, and 5E, the field-of-view of the device 124 changes from the field-of-view 111a at time T1 in FIG. 5A to a field-of-view 111d at time T2 in FIG. 5D and again to a field-of-view 111e at time T3 in FIG. 5E.

FIG. 5D illustrates an alternative second state 503b (e.g., associated with T2 or a second time period) of the example presentation scenario 500. In comparison to FIG. 5A, the field-of-view of the device 124 changes due to the device 124 performing a zoom out operation such that the field-of-view 111d of the device 124 captures the person 202, the tent 207, the snowman 205, and the trees 209, 211 within the physical environment 204. As shown in FIG. 5D, the field-of-view 111d of the device 124 of the physical environment 204 includes the person 202, the tent 207, the snowman 205, and trees 209, 211 appearing smaller and farther away than in FIG. 5A.

Following on this example, as shown in the UI display status information 226 in FIG. 5D, the prominence-display value 523 associated with the UI element 512 for the person 202 does not satisfy a prominence criterion 521 (e.g., a predefined or deterministic value). Accordingly, the device 124 does not modify the visual characteristics of the UI element 512 from the default UI display appearance 528. Additionally, the device 124 obtains an object-specific flag for the UI element 512 corresponding to the person 202, and in response to identifying the person 202 within the image data associated with the field-of-view 111d, displays the UI element 512 proximate to the person 202 in the physical environment 204. In addition, as shown in the UI display status information 226 in FIG. 5D, the prominence-display value 522 associated with the UI element 510 for the snowman 205 satisfies the prominence criterion 524. Additionally, in this example, the device 124 obtains an object-specific flag for UI element 510 corresponding to the snowman 205, and in response to identifying the snowman 205 within the image data associated with the field-of-view 111d, displays the UI element 510 proximate to the snowman 205 in the physical environment 204. Accordingly, in response to detecting a change in the field-of-view of the device 124 (e.g., zooming out from the field-of-view 111a at time T1 in FIG. 5A to the field-of-view 111d at time T2 in FIG. 5D) and determining that the prominence-display value 522 for the UI element 510 satisfies the prominence criterion 524, the device 124 displays, via the display 122, the UI element 510 as an overlay on the physical environment 204. In this particular example, the device 124 displays, on the display 122, the user interface 203 including the person 202, a UI element 512 overlaid proximate to the person 202, the tent 207, the snowman 205, the UI element 510 overlaid proximate to the snowman 205, and the trees 209, 211.

FIG. 5E illustrates an alternative third state 505b (e.g., associated with T3 or a third time period) of the example presentation scenario 500. In comparison to FIG. 5D, the field-of-view of the device 124 changes again due to the device 124 performing a second zoom out operation such that the device 124 now captures a view of the person 202, the snowman 205, the trees 209, 211, and a pile of snowballs 518 within the physical environment 204. As shown in FIG. 5E, the field-of-view 111e of the device 124 of the physical environment 204 includes the pile of snowballs 518, the person 202, the tent 207, the snowman 205, and trees 209, 211 appearing smaller and farther away than in FIG. 5D.

Continuing with this example, as shown in FIG. 5E, the UI display status information 226, the prominence-display value 523 associated with the UI element 512 for the person 202 does not satisfy the prominence criterion 521 but does satisfy a lower prominence criterion 525 (e.g., a predefined or deterministic value). In some implementations, if the prominence-display value 523 satisfies the lower prominence criterion 525 but does not satisfy the prominence criterion 524, the device 124 displays a representation 527 of the UI element 512 rather than displaying the UI element 512. To that end, in contrast to FIG. 5D, the device 124 does not display the UI element 512 overlaid proximate to the person 202 but, instead, the device 124 displays the representation 527 of the UI element 512 proximate to the person 202.

In some implementations, a prominence-display value for an UI element associated with a particular object may decrease as the particular object becomes further away from the device 124 due to translational movement of the device 124. In some implementations, the prominence display value for the UI element may decrease as the device 124 displays the particular object as a smaller size within the user interface 203 due to a zoom-out operation of the device 124. In some implementations, a prominence-display value for a UI element may fall below both a prominence criterion and a lower prominence criterion, which causes the device 124 to not display the UI element (due to the distance or smaller size of the object captured by the device 124). As an example, in contrast to FIGS. 5A and 5D, the prominence-display value 522 for the UI element 510 associated with the snowman 205 no longer satisfies the prominence criterion 524 and also does not satisfy the lower prominence criterion 531 (e.g., a predefined or deterministic value) due to the device 124 displaying a smaller size of the snowman 205 in response to the second zoom out operation. Accordingly, in FIG. 5E, the device 124 does not display the UI element 510 or a representation of the UI element 510 overlaid proximate to the snowman 205 within the user interface 203 of the device 124.

Furthermore, as shown in the UI display status information 226 associated with the UI element 540 for the pile of snowballs 518, the prominence-display value 534 does not satisfy the prominence criterion 529 (e.g., a predefined or deterministic value). Accordingly, the device 124 does not modify the visual characteristics of the UI element 540 from the default UI display appearance 532. In addition, the device 124 obtains an object-specific flag for the UI element 540 associated with the pile of snowballs 518, and determines that multiple instances of snowballs (e.g., using instance segmentation or the like) are present within the image data associated with the field-of-view 111e. To that end, the device 124 displays the UI element 540 proximate to a single instance of a snowball instead of displaying multiple instances of the UI element 540 for each instance of a snowball that is present within the physical environment 204. In this example, the device 124 selects a single instance of the object from among the multiple instances of snowballs by choosing the snowball that is closest to the middle of the field-of-view of the device 124 or by some other means. As such, in FIG. 5E, the device 124 displays, on the display 122, the user interface 203 including the pile of snowballs 518, a single instance of the UI element 540 overlaid proximate to a single instance of a snowball from among the pile of snowballs 518, the person 202, a representation 527 of the UI element 512 proximate to the person 202, the tent 207, the snowman 205, and the trees 209, 211.

FIGS. 6A-6C illustrate an example presentation scenario 600 sequence for maintaining a visual display of a UI element in accordance with some implementations. While pertinent features are shown, those of ordinary skill in art will appreciate from the present disclosure that various other features have not been illustrated for the sake of brevity and so as not to obscure more pertinent aspects of the example implementations disclosed herein.

The sequence shown in FIGS. 6A and 6B depicts objects within the field-of-view of the device 124 changing due to an object moving out of the field-of-view of the device 124 while the field-of-view of the device 124 remains stationary. In the sequence shown in FIGS. 6A and 6B, for example, an emergency response vehicle 615 associated with a UI element 607 moves out of the field-of-view 606a of the device 124 at time T2 in FIG. 6B.

FIG. 6A illustrates a first state 601 (e.g., associated with T1 or a first time period) of an example presentation scenario 600. In the first state 601, at least a portion of the physical environment 604 is within a field-of-view 606a of an external-facing image sensor of a device 124. As shown in FIG. 6A, the physical environment 604 includes a person 618, a stop sign 608, an emergency response vehicle 615, and a house 609. In some implementations, where the field-of-view of a user is enclosed, the device 124 is configured to enable video pass-through of the physical environment 604 including the stop sign 608, the emergency response vehicle 615, and the house 609 on the display 122 and to present the user interface 602 on the display 122. In some implementations, the display 122 corresponds to an additive display that enables optical-see through of the physical environment 604 including the stop sign 608, the emergency response vehicle 615, and the house 609. For example, the display 122 corresponds to a transparent lens, and the device 124 corresponds to a pair of glasses worn by the user. In some implementations, the device 124 presents the user interface 602 by projecting the UI element 607 onto the additive display, which is, in turn overlaid on the physical environment 604 from the perspective of the user. In some implementations, the device 124 presents the user interface 602 by rendering the UI element 607 on the additive display, which is also, in turn overlaid on the physical environment 604 from the perspective of the user.

As shown in FIG. 6A, the UI display status information 226 for the UI element 607 associated with the emergency response vehicle 615 includes a prominence-display status 620 and a default UI display appearance 613. In this example, a prominence-display value 622 associated with the UI element 607 for the emergency response vehicle 615 satisfies the prominence criterion 624 (e.g., a predefined or deterministic value). In response to determining that the prominence-display value 622 satisfies the prominence criterion 624, the device 124 modifies the visual characteristics of the UI element 607 such that the UI element 607 is visually prominent when overlaid on the physical environment 604. Additionally, in this example, the device 124 obtains an object-specific flag for the UI element 607 associated with the emergency response vehicle 615 and determines that the emergency response vehicle 615 is present within the image data associated with the field-of-view 606a. Accordingly, the device 124 displays, on a display 122, a user interface 602 including the stop sign 608, the emergency response vehicle 615, the UI element 607 proximate to the emergency response vehicle 615, and a partial view of the house 609. In this example, the device 124 does not display UI elements for the stop sign 608 or the house 609 because the library of UI elements for the current application or plug-in does not include UI elements for the stop sign 608 or the house 609.

In some implementations, a critical objects list includes a plurality of critical objects. In turn, when the device 124 detects an object within environmental data that is included on the critical objects list, the device 124 continues to display a representation of the UI element associated with the object even after the object is no longer present within the field-of-view of the device. Therefore, if the device 124 detects an object within the environmental data and determines that the detected object is on the critical objects list, the device 124 sets a critical-objects flag for a UI element associated with the detected object in order to indicate that the UI element is critical. Setting the critical-objects flag for the UI element associated with the detected object enables the device 124 to display a representation of the UI element associated with the detected object after the detected object is no longer present in the field-of-view of the device. With reference to FIG. 6A, for example, the developer or owner of the UI element 607 associated with the emergency response vehicle 615 places the emergency response vehicle 615 on a critical objects list. In response to detecting the emergency response vehicle 615 within environmental data and determining that the emergency response vehicle 615 is on the critical objects list, the device 124 sets a critical-objects flag for the UI element 607 associated with the emergency response vehicle 615. As such, the device 124 will display a representation of the UI element 607 associated with the emergency response vehicle 615 when the emergency response vehicle 615 is no longer present in the subsequent field-of-views.

FIG. 6B illustrates a second state 603 (e.g., associated with T2 or a second time period) of the example presentation scenario 600. In FIG. 6B, the field-of-view 606a of the device 124 is the same as in FIG. 6A because the device 124 is stationary. However, in contrast to FIG. 6A, the emergency response vehicle 615 moves locations in FIG. 6B such that the emergency response vehicle 615 is no longer in the field-of-view 606a of the device 124. In addition, also in contrast to FIG. 6A, the person 618 moves locations such that the person 618 is now in the field-of-view 606a of the device 124.

As explained above, at time T1 in FIG. 6A, the device 124 sets the critical-object flag for the UI element 607 associated with the emergency response vehicle 615 because the device 124 identifies emergency response vehicle 615 within the image data and determines that the emergency response vehicle 615 appears on the critical objects list. Accordingly, at time T2 in FIG. 6B, the device 124 determines whether the emergency response vehicle 615 is present within the image data associated with the field-of-view 606a. In response to determining that the emergency response vehicle 615 is not present within the image data associated with the field-of-view 606a at time T2, the device 124 displays a representation 617 of the UI element 607 as an overlay in the user interface 602. In this example, the representation 617 of the UI element 607 includes a directional arrow indicating where the emergency response vehicle 615 is located within the physical environment 604. Thus, in FIG. 6B, the device 124 displays, on the display 122, the user interface 602 including the stop sign 608, the person 618, the representation 617 of the UI element 607 associated with the emergency response vehicle 615, and a partial view of the house 609. In this example, the device 124 does not display UI elements for the person 618, the stop sign 608, or the house 609 because the library of UI elements for the current application or plug-in does not include a UI element for the person 618, the stop sign 608, or the house 609.

The sequence shown in FIGS. 6B and 6C depicts objects within the field-of-view of the device 124 changing due to rotational movement of the device 124. In the sequence shown in FIGS. 6B and 6C, for example, the field-of-view of the device 124 changes due to the rotational movement of the device 124 from a field-of-view 606a at time T2 in FIG. 6B to a field-of-view 606b at time T3 in FIG. 6C.

FIG. 6C illustrates a third state 605 (e.g., associated with T3 or a third time period) of the example presentation scenario 600. In comparison to FIG. 6B, as shown in FIG. 6C, the field-of-view of the device 124 changes from the field-of-view 606a in FIG. 6B to the field-of-view 606b due to the rotational movement of the device 124. As shown in FIG. 6C, the field-of-view 606b of the device 124 of the physical environment 604 includes the house 609, and a pedestrian 631, but does not include the person 618, the stop sign 608, or the emergency response vehicle 615.

Accordingly, similar to FIG. 6B, the device 124 determines whether the emergency response vehicle 615 is present within the field-of-view 606b of the device 124 at time T3 in FIG. 6C. In response to determining that the emergency response vehicle 615 is not present within the field-of-view 606b of the device 124 at time T3, the device 124 displays a representation 617 of the UI element 607 as an overlay in the user interface 602 in FIG. 6C. In some implementations, the device 124 generates the representation 617 of the UI element 607 including the directional arrow indicating where the emergency response vehicle 615 is within the physical environment 604. In some implementations, the device 124 continues to display the representation 617 of the UI element 607 for a predetermined time period. In some implementations, the device 124 continues to display the representation 617 of the UI element 607 until a microphone on the device 124 stops detecting a sound input associated with the emergency response vehicle 615.

Additionally, the device 124 displays a UI element (e.g., the UI element 633 associated with the pedestrian 631) as an overlay on the physical environment 604 based at least in part on obtaining a request to display the UI element or identifying a recognized object associated with the UI element within the field-of-view. As shown in the UI display status information 226 for the UI element 633 for the pedestrian 631, the prominence-display value 621 satisfies the prominence criterion 624. Accordingly, the device 124 modifies the visual characteristics of the UI element 633 from a default UI display appearance 619 of black text displaying "pedestrian" against a white background to white text displaying "pedestrian" against a black background. In addition, the device 124 modifies the size of the UI element 633 to be larger than the default UI display appearance 619. In this example, the modified visual characteristics of the UI element 633 creates a high level of contrast against the physical environment 604 such that the UI element 633 is easily identified when overlaid on the physical environment 604. Furthermore, in this example, the device 124 obtains an object-specific flag for the UI element 633 associated with the pedestrian 631, and in response to identifying the pedestrian 631 within the image data associated with the field-of-view 606b, displays the UI element 633 proximate to the pedestrian 631 in the physical environment 604. Thus, in FIG. 6C, the device 124 displays, on a display 122, the user interface 602 including the representation 617 of the UI element 607 associated with the emergency response vehicle 615, a full view of the house 609, the pedestrian 631, and the UI element 633 overlaid proximate to the pedestrian 631.

FIGS. 7A-7B illustrate an example presentation scenario 700 sequence for not maintaining a visual display of a UI element in accordance with some implementations. While pertinent features are shown, those of ordinary skill in art will appreciate from the present disclosure that various other features have not been illustrated for the sake of brevity and so as not to obscure more pertinent aspects of the example implementations disclosed herein.

The sequence shown in FIGS. 7A and 7B depicts objects within the field-of-view 706 of the device 124 changing due to an object moving out of the field-of-view 706 of the device 124 while the field-of-view 706 of the device 124 remains stationary. In the sequence shown in FIGS. 7A and 7B, for example, a remote-control vehicle 723 associated with a UI element 731 moves out of the field-of-view 706 at a time T2 in FIG. 6B.

FIG. 7A illustrates a first state 701 (e.g., associated with T1 or a first time period) of an example presentation scenario 700. In the first state 701, at least a portion of the physical environment 704 is within a field-of-view 706 of an external-facing image sensor of the device 124. As shown in FIG. 7A, the physical environment 704 includes a remote-control vehicle 723. In some implementations, where the field-of-view of a user is enclosed, the device 124 is configured to enable video pass-through of the physical environment 704 including the remote-control vehicle 723 on the display 122 and to present the user interface 702 on the display 122. In some implementations, the display 122 corresponds to an additive display that enables optical-see through of the physical environment 704 including the remote-control vehicle 723. For example, the display 122 corresponds to a transparent lens, and the device 124 corresponds to a pair of glasses worn by the user. In some implementations, the device 124 presents the user interface 702 by projecting the UI element 731 onto the additive display, which is, in turn overlaid on the physical environment 704 from the perspective of the user. In some implementations, the device 124 presents the user interface 702 by rendering the UI element 731 on the additive display, which is also, in turn overlaid on the physical environment 704 from the perspective of the user.

As shown in FIG. 7A, the UI display status information 226 associated with a UI element 731 for the remote-control vehicle 723 includes the prominence-display status 720 and a default UI display appearance 711. In this example, the device 124 determines that a prominence-display value 713 associated with the UI element 731 for the remote-control vehicle 723 does not satisfy the prominence criterion 715 (e.g., a predefined or deterministic value). In response to determining that the prominence-display value 713 does not satisfy the prominence criterion 715, the device 124 does not modify the visual characteristics of the UI element 731 from the default UI display appearance 711.

In this example, the device 124 obtains an object-specific flag for the UI element 731 for the tires of the remote-control vehicle 723, and in response to determining that at least one instance of the tire is present within the image data associated with the field-of-view 706, displays the UI element 731 proximate to a tire of the remote-control vehicle 723. In addition, the device 124 determines that the remote-control vehicle 723 does not match an object from a critical object list so the device 124 foregoes setting the critical-object flag for the UI element 731 associated with the remote-control vehicle 723. Furthermore, the device 124 or the controller (e.g., the controller 102 shown in FIGS. 1 and 9) determines that the physical environment includes two instances of the tire. To that end, the device 124 displays a single instance of the UI element 731 proximate to a single tire of the remote-control vehicle 723 rather than displaying multiple instances of the UI element 731 proximate to each instance of a tire of the remote-control vehicle 723. Here, the device 124 determines which one of the two tires on the remote-control vehicle 723 to display the single instance of the UI element 731 at random. As such, in FIG. 7A, the device 124 displays, on a display 122, a user interface 702 including the remote-control vehicle 723, and a single instance of the UI element 731 overlaid proximate to a single instance of the tire of the remote-control vehicle 723.

FIG. 7B illustrates a second state 703 (e.g., associated with T2 or a second time period) of the example presentation scenario 700. As shown in FIG. 7B, the field-of-view 706 of the device 124 is the same as in FIG. 7A, but the remote-control vehicle 723 moves location such that the remote-control vehicle 723 is no longer in the field-of-view 706 of the device 124. As shown in FIG. 7B, the field-of-view 706 of the device 124 now captures an empty room. To that end, in FIG. 7B, the device 124 displays, on the display 122, the user interface 702 that includes an empty room.

Figure 8:
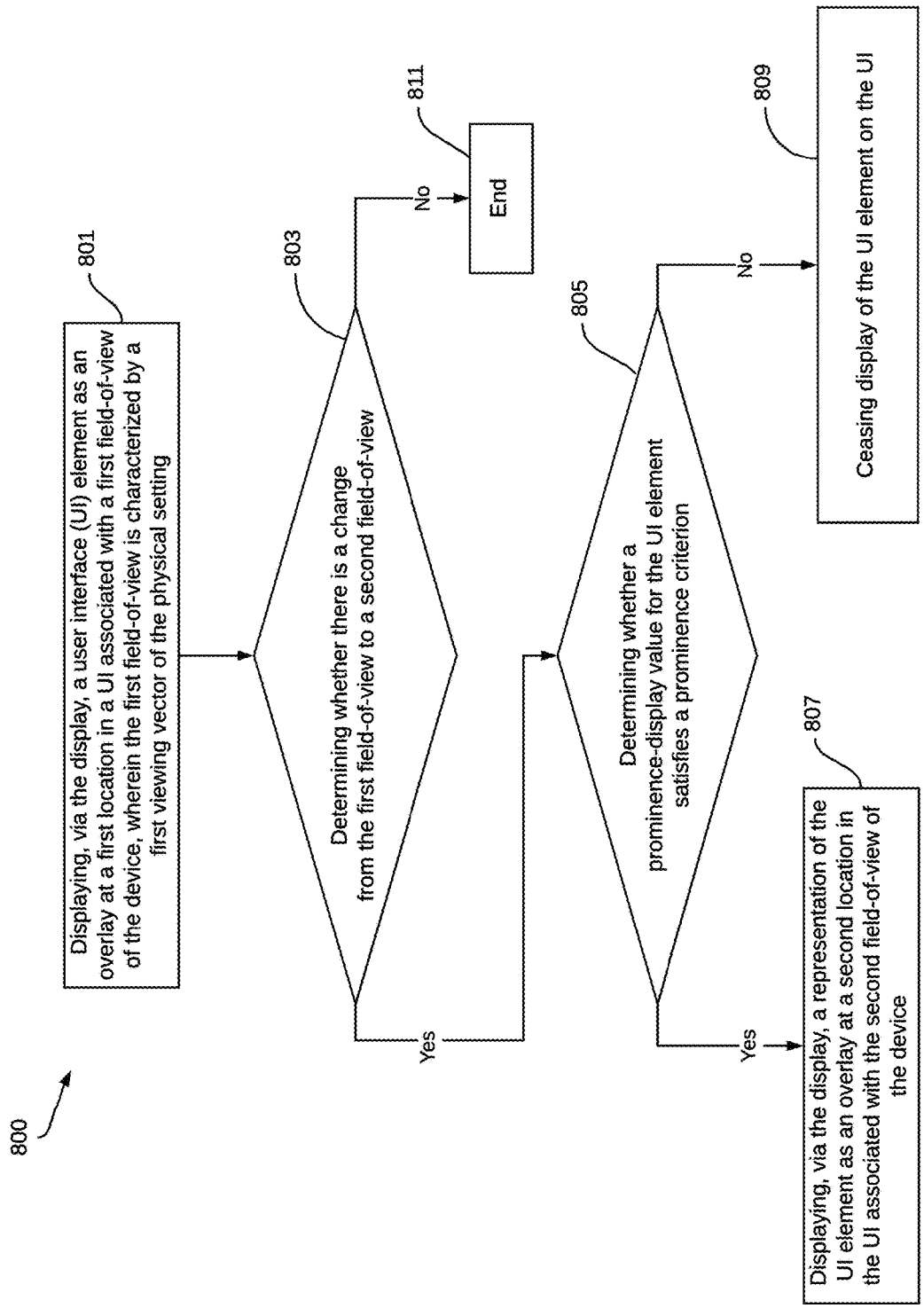
FIG. 8 is a flowchart representation of a method of maintaining a visual display of a UI element in accordance with some implementations.

FIG. 8 is a flowchart representation of a method 800 of maintaining a visual display of a UI element in accordance with some implementations. In various implementations, the method 800 is performed at a device (e.g., the device 124 shown in FIGS. 1 and 10; the controller 102 in FIGS. 1 and 9; or a suitable combination thereof) one or more processors, a non-transitory memory, and a display. In some implementations, the method 800 is performed by processing logic, including hardware, firmware, software, or a combination thereof. In some implementations, the method 800 is performed by a processor executing code stored in a non-transitory computer-readable medium (e.g., a memory).

As represented by block 801, the method 800 includes displaying, via the display, a UI element as an overlay at a first location in a UI associated with a first field-of-view of the device, wherein the first field-of-view is characterized by a first viewing vector of the physical environment. In some implementations, a viewing vector is defined by three degrees of freedom for the eyes of a user (e.g., the X- and Y-coordinates for the field-of-view plane and Z-coordinate depth for the depth/focus of the field-of-view plane), three degrees of rotational freedom (e.g., pitch, roll, yaw for the field-of-view or head of the user), and three degrees of translational freedom (e.g., X-, Y-, and Z-world coordinates of the device or user). In some implementations, the method 800 includes obtaining, from an image sensor of the device, the image data that corresponds to a field-of-view of the device, wherein the UI includes the image data associated with the first field-of-view of the device. In some implementations, the display corresponds to an additive display, and wherein the UI element is display on or projected onto the additive display.

In some implementations, the method 800 further includes obtaining an object-specific flag for the UI element, wherein the object-specific flag corresponds to a particular object; and in response to determining that at least one instance of the particular object is present within environmental data, displaying the UI element in visual proximity to the particular object in the physical environment. According to some implementations, visual proximity is defined relative to an image space associated with optical see-through incident to the user interface associated with the additive display or an image space defined by the pass-through image data. In some implementations, as a non-limiting example, the environmental data for detecting the presence of a particular object may include image data, audio data associated with the particular object, a BLUETOOTH signal associated with the particular object, a Wi-Fi connection associated with the particular object, and/or the like. For example, with reference to FIG. 6A, the device 124 may obtain an object-specific flag for the UI element 607, wherein the object-specific flag corresponds to the emergency response vehicle 615. In turn, continuing with the example in FIG. 6A, in response to determining that the emergency response vehicle 615 is present within environmental data by detecting sirens within audio data using one or more microphones on the device 124, displaying the UI element 607 in visual proximity to the emergency response vehicle 615 in the physical environment 604.

In some implementations, displaying the UI element proximate to or over an object in the physical environment includes displaying a representation of the UI element while the object is not visible in the second viewing vector of the physical environment. For example, in FIGS. 6A and 6B, the emergency response vehicle 615 is no longer visible in the field-of-view 606a of the device 124, but the device 124 displays the representation 617 of the UI element 607 as an overlay in the physical environment 604. As another example, as shown in FIG. 6C, the device 124 obtains an object specific flag for the UI element 633, wherein the object-specific flag corresponds to the pedestrian 631. Continuing with the example shown in FIG. 6C, in response to determining that at least one instance of the pedestrian 631 is present within the image data, the device 124 displays the UI element 633 proximate to the pedestrian 631 in the physical environment 604.

As represented by block 803, the method 800 includes determining whether there is a change from the first field-of-view to a second field-of-view, wherein the second field-of-view is characterized by a second viewing vector of the physical environment that is different from the first viewing vector. If there is no change from the first field-of-view to a second field-of-view ("No" path from block 803), as represented by block 811, the method 800 ends. However, if there is a change from the first field-of-view to the second field-of-view ("Yes" path from block 803), as represented by block 805, the method 800 includes determining whether a prominence-display value for the UI element satisfies a prominence criterion. In some implementations, determining whether the prominence-display value for the UI element satisfies the prominence criterion is based on whether a previous prominence-display value associated with the first field-of-view satisfied the prominence criterion. In some implementations, determining whether the prominence-display value for the UI element satisfies the prominence criterion is based on whether a prominence-display value associated with the second field-of-view satisfies the prominence criterion. In some implementations, the determination is based on a delta between the previous prominence-display value from the first field-of-view and the prominence-display value for the second field-of-view.

In some implementations, the change in the field-of-view of the device may correspond to a change in world coordinates (e.g., translation movement), head roll, swivel, or tilt (e.g., rotational movement), eye tracking, or zoom. For example, the sequence shown in FIGS. 5A-5C depicts the field-of-view of the device changing due to translational movement of the device 124. In another example, the sequence shown in FIGS. 5A, 5D, and 5E depicts the field-of-view of the device changing due to the device performing a zoom out operation of the device 124. In yet another example, the sequence shown in FIGS. 6B to 6C depicts the field-of-view of the device changing due to rotational movement of the device 124.

If the prominence-display value for the UI element satisfies the prominence criterion ("Yes" path from block 805), as represented by block 807, the method 800 includes displaying, via the display, a representation of the UI element as an overlay at a second location in the UI associated with the second field-of-view of the device. In some implementations, the representation of the UI element corresponds to the UI element itself or an indicator associated with the UI element. For example, as shown in FIG. 6B, the device 124 displays a representation 617 of the UI element 607 associated with the emergency response vehicle 615 overlaid on the physical environment 604 within the user interface 602 even though the emergency response vehicle 615 is out of the field-of-view 606b of the device 124.

In some implementations, displaying the UI element as an overlay on the second field-of-view further includes changing a perspective of a display of the UI element based at least in part on the change of field-of-view of the device. For example, the sequence shown in FIGS. 5A-5C depicts the perspective of a display of the UI element 510 changing due to change of field-of-view of the device 124 due to translational movement of the device 124 from field-of-view 111a at T1 in FIG. 5A to field-of-view 111b at time T2 in FIG. 5B and further to field-of-view 111c at time T3 in FIG. 5C. In some implementations, displaying the UI element at a second location as an overlay further includes adjusting a size or a dimension of the UI element based at least in part on a magnitude of the change between the first field-of-view of the device and the second field-of-view of the device. For example, if the device displays a UI element at a second location as an overlay, the device may adjust the size of the UI element to a smaller size based at least in part on the magnitude of the change between the first-field-of view of the device and the second field-of-view of the device due to translational movement that cause the object associated with the UI element to appear farther way and smaller.

In some implementations, displaying the representation of the UI element as the overlay at the second location in the UI associated with the second field-of-view of the device includes: determining whether the particular object matches an object from a critical object list; in response to determining that the particular object matches the object from the critical object list, setting a critical-object flag for the UI element associated with the particular object; determining whether the particular object is present within the environmental data associated with the second field-of-view of the device; and in response to determining that the particular object is not present in the environmental data associated with the second field-of-view of the device and in accordance with a determination that the critical-object flag for the UI element associated with the particular object was set, displaying, via the display, the representation of the UI element as the overlay at the second location in the UI associated with the second field-of-view of the device for a predetermined period. In some implementations, as a non-limiting example, the environmental data for detecting the presence of a particular object may include image data, audio data associated with the particular object, a BLUETOOTH signal associated with the particular object, a Wi-Fi connection associated with the particular object, and/or the like.

For example, as shown in FIGS. 6A and 6B, the device 124 determines that the emergency response vehicle 615 matches an object from the critical object list. Continuing with the example shown in FIGS. 6A and 6B, in response to determining that the emergency response vehicle 615 matches the object from the critical object list, the device 124 sets a critical-object flag for the UI element 607 associated with the emergency response vehicle 615. In response to determining that the emergency response vehicle 615 is not present in the environmental data associated with the field-of-view 606a at time T2 of the device 124 and in accordance with a determination that the critical-object flag for the UI element 607 associated with the emergency response vehicle 615 was set, the device 124 displays, via the display 122, the representation 617 of the UI element 607 as the overlay at a second location in the user interface 602 associated with the field-of-view 606a of the device 124 for a predetermined time period in FIG. 6B.

However, if the prominence-display value for the UI element does not satisfy the prominence criterion ("No" path from block 805), as represented by block 809, the method 800 includes ceasing display of the UI element on the user interface. For example, as shown in FIG. 7B, in response to determining that the prominence-display value 713 does not satisfy the prominence criterion 715, the device 124 ceases to display a UI element 731 on the user interface 702.

In some implementations, if the prominence-display value for the UI element does not satisfy the prominence criterion, but satisfies a lower prominence criterion, the device displays a representation of the UI element rather than displaying the UI element. For example, as shown in FIG. 5E, the prominence-display value 523 associated with the UI element 512 for the person 202 does not satisfy the prominence criterion 524 but satisfies the lower prominence criterion 525. As such, continuing with the example in FIG. 5E, the device 124 displays a representation 527 of the UI element 512 as an overlay rather than displaying the UI element 512 as an overlay.

In some implementations, the method 800 further includes in response to detecting the change from the first field-of-view to the second field-of-view and determining that the prominence-display value for the UI element satisfies the prominence criterion; determining environmental characteristics associated with the second field-of-view; and modifying one or more visual characteristics of the UI element based on the environmental characteristics associated with the second field-of-view. In some implementations, the environmental characteristics associated with the second field-of-view of the device corresponds to at least one of lighting characteristics, objects within the physical environment, and a background color. For example, as shown in FIGS. 6B and 6C, in response to detecting the change from the first field-of-view 606a to the second field-of-view 606b and determining that the prominence-display value 621 for the UI element 633 satisfies the prominence criterion 624, the device 124 modifies one or more visual characteristics of the UI element 633 from the default UI display appearance 619 of black text displaying "pedestrian" against a white background to larger white text displaying "pedestrian" against a black background based on the environment characteristics (e.g., background color) associated with the second field-of-view 606b.

In some implementations, the method 800 further includes changing a perspective of a display of the UI element based at least in part on the change of field-of-view of the device. For example, as shown in FIGS. 5A-5C, the device changes the perspective display of the UI element 510 associated with the snowman 205 based at least in part on the changes to the field-of-view of the device 124 due to translational movement of the device 124.

In some implementations, the method 800 further includes changing a perspective of a display of the UI element based at least in part on the change from the first field-of-view to the second field-of-view. For example, the sequence shown in FIGS. 5A-5C depicts the perspective of a display of the UI element 510 changing due to change of field-of-view of the device 124 (e.g., due to translational movement of the device 124 from field-of-view 111a at T1 in FIG. 5A to field-of-view 111b at time T2 in FIG. 5B and further to field-of-view 111c at time T3 in FIG. 5C).

In some implementations, the method 800 further includes after detecting the change from the first field-of-view to the second field-of-view, obtaining a second UI element; in response to determining that a second prominence-display value for the second UI element satisfies a prominence criterion, modifying one or more visual characteristics of the second UI element based on environmental characteristics associated with the second field-of-view characterized by the second viewing vector of the physical environment that is different from the first viewing vector of the physical environment; and displaying, via the display, the second UI element as an overlay at a third location in the UI associated with the second field-of-view of the device, wherein the second UI element includes the one or more modified visual characteristics. In some implementations, the device 124 modifies at least one of a brightness, a contrast, a saturation, a hue, rotational coordinates for the UI element within an image space defined by the user interface, translational coordinates for the UI element within an image space defined by the user interface, and a size value of the second UI element. In some implementations, the device 124 displays, via the display, the representation of the UI element as the overlay at the second location including adjusting a size or a dimension of the UI element based at least in part on a magnitude of the change between the first field-of-view of the device and the second field-of-view of the device. For example, with reference to the sequence shown in FIGS. 6B and 6C, after detecting the change from the first field-of-view 606a to the second field-of-view 606b, the device 124 obtains the UI element 633 associated with the pedestrian 631. Continuing with the example sequence shown in FIGS. 6B and 6C, in response to determining that the prominence-display value 621 for the UI element 633 satisfies a prominence criterion 624, the device 124 modifies one or more visual characteristics of the UI element 633 from the default UI display appearance 619 of black text displaying "pedestrian" against a white background to larger white text displaying "pedestrian" against a black background based on the environment characteristics (e.g., background color) associated with the second field-of-view 606b. Furthermore, continuing with the example in FIG. 6C, the device 124 displays, via the display 122, the UI element 633 as an overlay at a third location in the user interface 602 associated with the second field-of-view 606b of the device 124.

In some implementations, the method 800 further includes adjusting the prominence-display value based on a determination that a user of the device gazes at the UI element past a time threshold. For example, with reference to FIG. 7A, if the device 124 determines that a user of the device 124 gazes at the remote-control vehicle 723 past a time threshold, the device 124 increases the prominence-display value 713 such that the prominence-display value 713 satisfies the prominence criterion 715. As a result, the device 124 modifies one or more visual characteristics of the UI element 731 instead of displaying the default UI display appearance 711.

Figure 9:
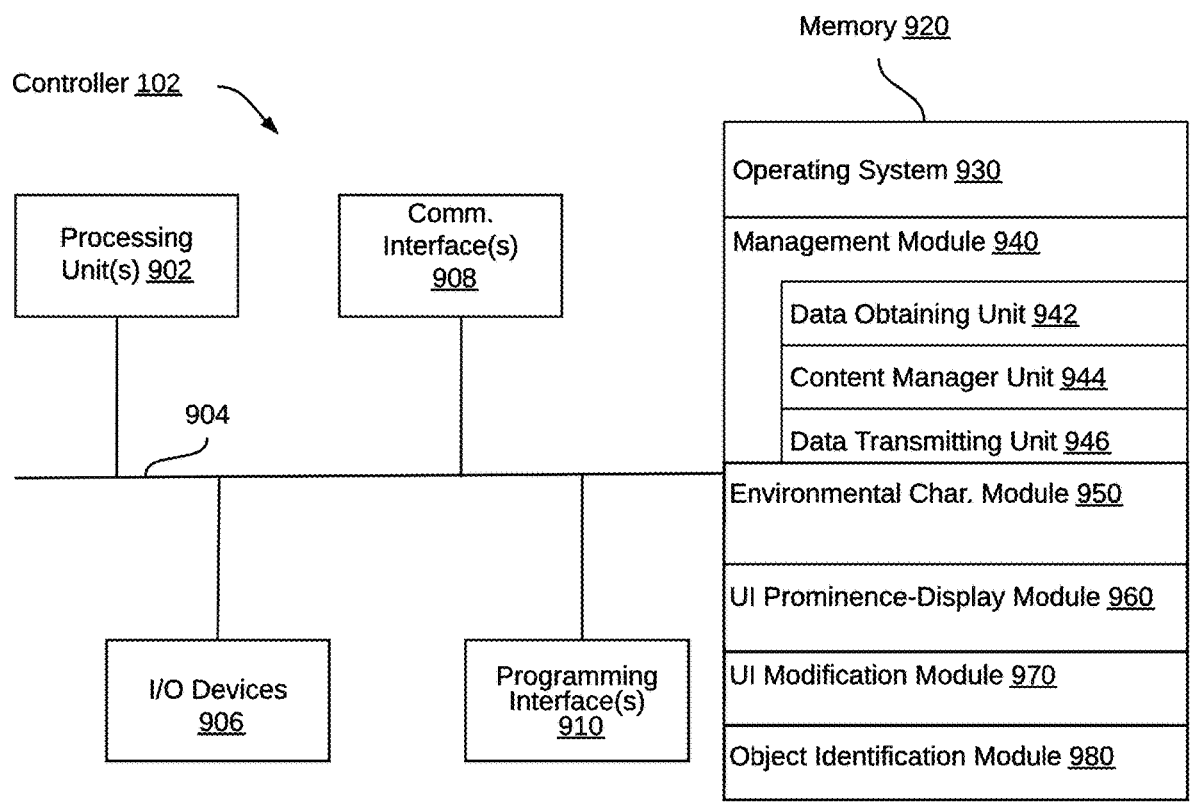
FIG. 9 is a block diagram of an example controller in accordance with some implementations.

FIG. 9 is a block diagram of an example controller (e.g., the controller 102 shown in FIG. 1) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the controller 102 includes one or more processing units 902 (e.g., microprocessors, application-specific integrated-circuits (ASICs), field-programmable gate arrays (FPGAs), graphics processing unit (GPUs), central processing units (CPUs), processing cores, and/or the like), one or more input/output (I/O) devices and sensors, one or more communications interfaces 908 (e.g., universal serial bus (USB), IEEE 802.3x, IEEE 802.11x, IEEE 802.16x, global system for mobile communications (GSM), code division multiple access (CDMA), time division multiple access (TDMA), global positioning systems (GPS), infrared (IR), BLUETOOTH, ZIGBEE, and/or the like type interfaces), one or more programming (e.g., I/O) interfaces 910, a memory 920, and one or more communication buses 904 for interconnecting these and various other components.

In some implementations, the one or more communication buses 904 include circuitry that interconnects and controls communications between system components. In some implementations, the one or more I/O devices and sensors 906 include at least one of a keyboard, a mouse, a touchpad, a joystick, one or more microphones, one or more speakers, one or more image sensors, one or more displays, and/or the like.

The memory 920 includes high-speed random-access memory, such as DRAM, SRAM, DDR, RAM, or other random-access solid-state memory devices, and may include non-volatile memory, such as one or more magnetic disk storage devices, optical disk storage devices, flash memory devices, or other non-volatile solid-state storage devices. The memory 920 optionally includes one or more storage devices remotely located from the one or more processing units 902. The memory 920 comprises a non-transitory computer readable storage medium. In some implementations, the memory 920 or the non-transitory computer readable storage medium of the memory 920 stores the following programs, modules, and data structures, or a subset thereof including an operating system 930, a management module 940, an environmental characterization module 950, a UI prominence-display module 960, a UI modification module 970, and an object identification module 980. In some implementations, one or more instructions are included in a combination of logic and non-transitory memory.

The operating system 930 includes procedures for handling various basic system services and for performing hardware-dependent tasks.

In some implementations, the management module 940 is configured to render, manage, and/or coordinate one or more user interfaces (e.g., the user interface 128 shown in FIG. 1, the user interface 203 shown in FIGS. 2, 3, and 5A-5E, the user interface 602 shown in FIGS. 6A-6C, and the user interface 702 shown in FIG. 7A-7B) for one or more devices associated with different users. To that end, in various implementations, the management module 940 includes a data obtaining unit 942, a content manager unit 944, and a data transmitting unit 946.

Figure 10:
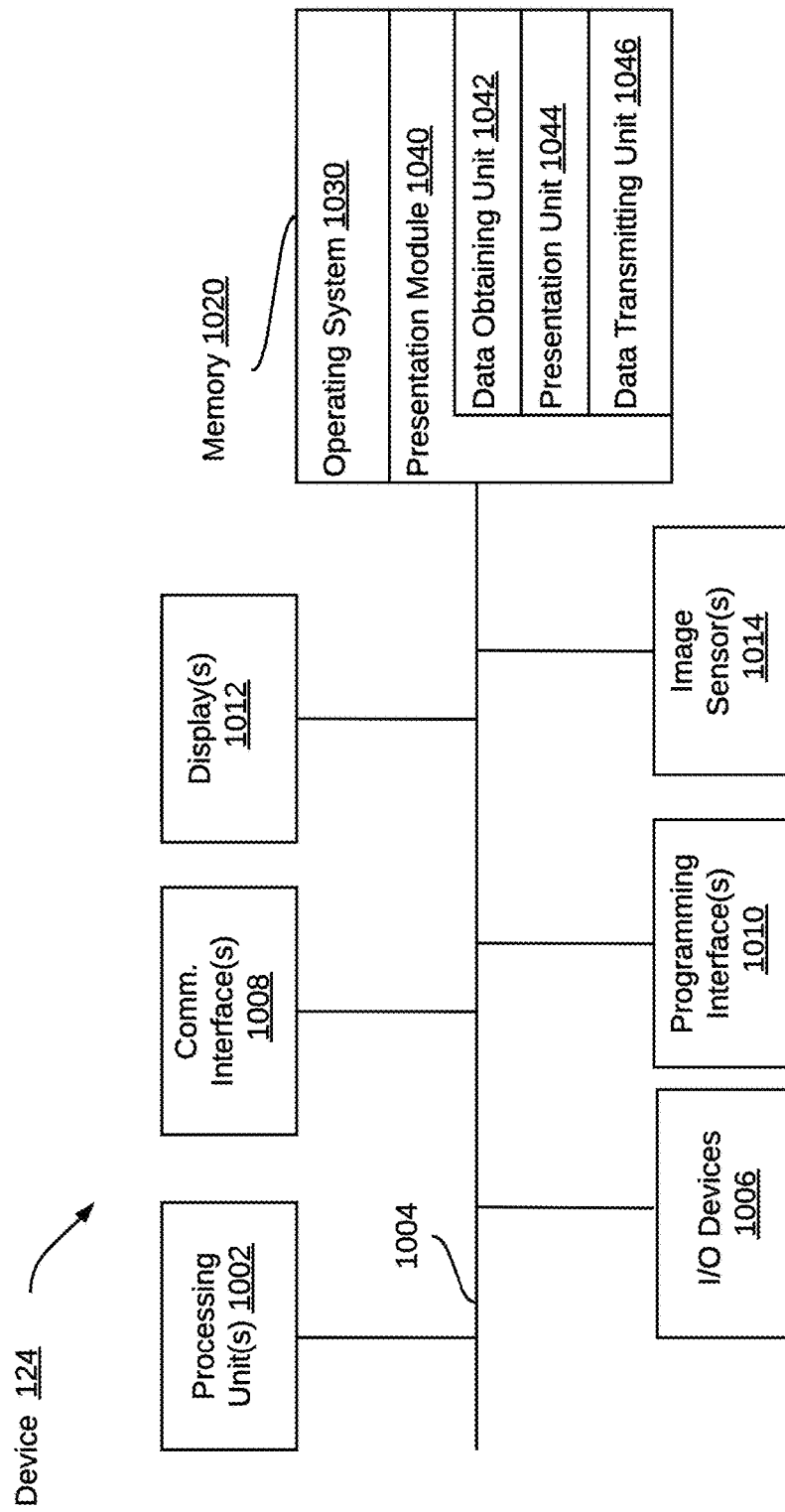
FIG. 10 is a block diagram of an example device in accordance with some implementations.

In some implementations, the data obtaining unit 942 is configured to obtain data (e.g., presentation data, user interaction data, sensor data, location data, etc.) from at least the device 124 shown in FIGS. 1 and 10. To that end, in various implementations, the data obtaining unit 942 includes instructions and/or logic therefor, and heuristics and metadata therefor.

In some implementations, the content manager unit 944 is configured to manage and coordinate the user interface presented to the user by the device 124 shown in FIGS. 1 and 10. To that end, in various implementations, the content manager unit 944 includes instructions and/or logic therefor, and heuristics and metadata therefor.

In some implementations, the data transmitting unit 946 is configured to transmit data (e.g., presentation data, location data, etc.) to at least the device 124 shown in FIGS. 1 and 10. To that end, in various implementations, the data transmitting unit 946 includes instruction and/or logic therefor, and heuristics and metadata therefor.

In some implementations, the environmental characterization module 950 is configured to determine environmental characteristics of the physical environment based on environmental data. To that end in various implementations, the environmental characterization module 950 includes instructions and/or logic therefor, and heuristics and metadata therefor.

In some implementations, the UI prominence-display module 960 is configured to determine whether a prominence-display value for a UI element satisfies a prominence criterion. In some implementations, the UI prominence-display module 960 is configured to display the UI element as an overlay on the physical environment. To that end in various implementations, the UI prominence-display module 960 includes instructions and/or logic therefor, and heuristics and metadata therefor.

In some implementations, the UI modification module 970 is configured to modify one or more visual characteristics of the UI element based on the environmental characteristics of the physical environment. To that end in various implementations, the UI modification module 970 includes instructions and/or logic therefor, and heuristics and metadata therefor.

In some implementations, the object identification module 980 is configured to identify one or more objects in the physical environment. To that end in various implementations, the object identification module 980 includes instructions and/or logic therefor, and heuristics and metadata therefor.

Although the management module 940, the environmental characterization module 950, the UI prominence-display module 960, the UI modification module 970, and the object identification module 980 are shown as residing on a single device (e.g., the controller 102), it should be understood that in some implementations, any combinations of the management module 940, the environmental characterization module 950, the UI prominence-display module 960, the UI modification module 970, and the object identification module 980 may be located in separate computing devices.

In some implementations, the functionalities of the controller 102 are provided by and/or combined with the device 124 shown below in FIG. 10. Moreover, FIG. 9 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 9 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIG. 10 is a block diagram of an example device 124 (e.g., a mobile phone, tablet, laptop, near-eye system, etc.) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 124 includes one or more processing units 1002 (e.g., microprocessors, ASICs, FPGAs, GPUs, CPUs, processing cores, and/or the like), one or more I/O devices and sensors 1006, one or more communications interfaces 1008 (e.g., USB, IEEE 802.3x, IEEE 802.11x, IEEE 802.16x, GSM, CDMA, TDMA, GPS, IR, BLUETOOTH, ZIGBEE, and/or the like type interfaces), one or more programming interfaces 1010, one or more displays 1012, one or more image sensors 1014, a memory 1020, and one or more communication buses 1004 for interconnecting these and various other components.

In some implementations, the one or more communication buses 1004 include circuitry that interconnects and controls communications between system components. In some implementations, the one or more I/O devices and sensors 1006 include at least one of an illumination sensor, ambient light sensor, motion sensor, depth sensor, inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, and/or the like.

In some implementations, the one or more displays 1012 are capable of presenting a user interface (e.g., the user interface 128 shown in FIG. 1, the user interface 203 shown in FIGS. 2, 3, and 5A-5E, the user interface 602 shown in FIGS. 6A-6C, and the user interface 702 shown in FIGS. 7A and 7B) or CGR content. In some implementations, the one or more displays 1012 are also configured to present flat video content to the user (e.g., a 2-dimensional or "flat" audio video interleave (AVI), flash video (FLV), Windows Media Video (WMV), or the like file associated with a TV episode or a movie, or live video pass-through of the operating environments. In some implementations, the one or more displays 1012 correspond to an additive display, holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro mechanical systems (MEMS), and/or the like display types. In some implementations, the one or more displays 1012 correspond to diffractive, reflective, polarized, holographic, etc. waveguide displays. For example, the device 124 includes a single display. In another example, the device 124 includes a display for each eye of the user.

In some implementations, the one or more image sensors 1014 are configured to obtain image data frames. For example, the one or more image sensors 1014 correspond to one or more RGB cameras (e.g., with a CMOS image sensor, or a CCD image sensor), infrared (IR) image sensors, event-based cameras, and/or the like.

The memory 1020 includes high-speed random-access memory, such as DRAM, SRAM, DDR RAM, or other random-access solid-state memory devices. In some implementations, the memory 1020 includes non-volatile memory, such as one or more magnetic disk storage devices, optical disk storage devices, flash memory devices, or other non-volatile solid-state storage devices. The memory 1020 optionally includes one or more storage devices remotely located from the one or more processing units 1002. The memory 1020 comprises a non-transitory computer readable storage medium. In some implementations, the memory 1020 or the non-transitory computer readable storage medium of the memory 1020 stores the following programs, modules and data structures, or a subset thereof including an optional operating system 1030 and a presentation module 1040.

The optional operating system 1030 includes procedures for handling various basic system services and for performing hardware dependent tasks. In some implementations, the presentation module 1040 is configured to present user interfaces or CGR content to the user via the one or more displays 1012. To that end, in various implementations, the presentation module 1040 includes a data obtaining unit 1042, a presentation unit 1044, and a data transmitting unit 1046.

In some implementations, the data obtaining unit 1042 is configured to obtain data (e.g., presentation data, interaction data, location data, etc.) from at least one of the one or more I/O devices and sensors 1006 associated with the device 124, the controller 102 shown in FIGS. 1 and 9, and the optional remote input devices. To that end, in various implementations, the data obtaining unit 1042 includes instructions and/or logic therefor, and heuristics and metadata therefor.

In some implementations, the presentation unit 1044 is configured to present a user interface (e.g., the user interface 128 shown in FIG. 1, the user interface 203 shown in FIGS. 2, 3, and 5A-5E, the user interface 602 shown in FIGS. 6A-6C, and the user interface 702 shown in FIG. 7A-7B) via the one or more displays 1012. To that end, in various implementations, the presentation unit 1044 includes instructions and/or logic therefor, and heuristics and metadata therefor.

In some implementations, the data transmitting unit 1046 is configured to transmit data (e.g., presentation data, location data, etc.) to at least the controller 102 shown in FIGS. 1 and 9. To that end, in various implementations, the data transmitting unit 1046 includes instructions and/or logic therefor, and heuristics and metadata therefor.

Although the data obtaining unit 1042, the presentation unit 1044, and the data transmitting unit 1046 are shown as residing on a single device (e.g., the device 124 shown in FIGS. 1 and 10), it should be understood that in some implementations, any combination of the data obtaining unit 1042, the presentation unit 1044, and the data transmitting unit 1046 may be located in separate computing devices. In some implementations, the functions and/or components of the controller 102 are combined with or provided by the device 124.

Moreover, FIG. 10 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 10 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first object could be termed a second object, and, similarly, a second object could be termed a first object, which changing the meaning of the description, so long as the occurrences of the "first object" are renamed consistently and the occurrences of the "second object" are renamed consistently. The first object and the second object are both objects, but they are not the same object.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device including one or more environmental sensors, one or more processors, a non-transitory memory, and a display:
      displaying, via the display, a user interface (UI) element as an overlay at a first location in a UI associated with a first field-of-view of the device, wherein the first field-of-view is characterized by a first viewing vector of a physical environment;
      detecting a change from the first field-of-view of the device to a second field-of-view of the device, wherein the second field-of-view is characterized by a second viewing vector of the physical environment that is different from the first viewing vector; and
      in response to detecting the change from the first field-of-view to the second field-of-view, determining a prominence-display value for the UI element;
      in accordance with a determination that the prominence-display value for the UI element exceeds a prominence threshold, displaying, via the display, the UI element as the overlay at a second location in the UI associated with the second field-of-view of the device; and
      in accordance with a determination that the prominence-display value for the UI element does not exceed the prominence threshold, ceasing display of the UI element in the UI associated with the second field-of-view of the device.

2. The method of claim 1, wherein the prominence-display value for the UI element corresponds to one of a level of criticality or a level of importance associated with the UI element.

3. The method of claim 1, further comprising:
   adjusting the prominence-display value for the UI element based on a determination that a user of the device gazes at the UI element greater than a threshold length of time.

4. The method of claim 1, further comprising:
   obtaining, from an image sensor of the device, image data that corresponds to the first field-of-view of the device, wherein the UI includes the image data associated with the first field-of-view of the device.

5. The method of claim 1, wherein displaying the UI element as the overlay at the second location in the UI associated with the second field-of-view of the device includes changing a perspective of the display of the UI element based at least in part on the change from the first field-of-view to the second field-of-view.

6. The method of claim 1, further comprising:
   in response to detecting the change from the first field-of-view to the second field-of-view and in accordance with the determination that the prominence-display value for the UI element exceeds a prominence threshold:
      determining environmental characteristics associated with a portion of the physical environment within the second field-of-view of the device; and
      modifying one or more visual characteristics of the UI element based on the environmental characteristics associated with the portion of the physical environment within the second field-of-view of the device.

7. The method of claim 6, wherein the environmental characteristics associated with the portion of the physical environment within the second field-of-view of the device correspond to at least one of lighting characteristics, objects within the physical environment, or a background color.

8. The method of claim 6, wherein the one or more modified visual characteristics include modifying at least one of a brightness, a contrast, a hue, a saturation, rotation coordinates, translational coordinates, or a size value of the UI element.

9. The method of claim 6, wherein modifying the one or more visual characteristics of the UI element is based at least in part on user accessibility parameters.

10. The method of claim 6, wherein modifying the one or more visual characteristics of the UI element is based at least in part on maintaining at least one visual attribute of the UI element.

11. The method of claim 10, wherein maintaining the at least one visual attribute of the UI element includes modifying at least one visual characteristic of the UI element to contrast with the portion of the physical environment within the second field-of-view of the device.

12. The method of claim 11, wherein the at least one visual attribute of the UI element corresponds to at least one of a color, a geometric shape, a texture, and a size.

13. The method of claim 1, further comprising:
after detecting the change from the first field-of-view to the second field-of-view, obtaining a request to display a second UI element;
in response to obtaining the request to display the second UI element, determining a second prominence-display value for the second UI element and determining environmental characteristics associated with a portion of the physical environment within the second field-of-view of the device;
in accordance with a determination that the prominence-display value for the second UI element exceeds the prominence threshold:
modifying one or more visual characteristics of the second UI element based on the environmental characteristics associated with the portion of the physical environment within the second field-of-view of the device; and
displaying, via the display, the second UI element as a modified overlay on the portion of the physical environment within the second field-of-view of the device, wherein the second UI element includes the one or more modified visual characteristics while displayed as the modified overlay; and
in accordance with a determination that the prominence-display value for the second UI element does not exceed the prominence threshold:
foregoing modifying the one or more visual characteristics of the second UI element; and
displaying, via the display, the second UI element as an unmodified overlay on the portion of the physical environment within the second field-of-view of the device, wherein the unmodified overlay is different from the modified overlay, and wherein the unmodified overlay does not include the one or more modified visual characteristics.

14. The method of claim 13, wherein modifying the one or more visual characteristics of the second UI element includes modifying at least one of a brightness, a contrast, a saturation, a hue, rotational coordinates, translational coordinates, and a size value of the second UI element.

15. A device comprising:
one or more environmental sensors;
a display;
one or more processors;
a non-transitory memory; and
one or more programs stored in the non-transitory memory, which, when executed by the one or more processors, cause the device to:
display, via the display, a user interface (UI) element as an overlay at a first location in a UI associated with a first field-of-view of the device, wherein the first field-of-view is characterized by a first viewing vector of a physical environment;
detect a change from the first field-of-view of the device to a second field-of-view of the device, wherein the second field-of-view is characterized by a second viewing vector of the physical environment that is different from the first viewing vector; and
in response to detecting the change from the first field-of-view to the second field-of-view, determine a prominence-display value for the UI element;
in accordance with a determination that the prominence-display value for the UI element exceeds a prominence threshold, display, via the display, the UI element as the overlay at a second location in the UI associated with the second field-of-view of the device; and
in accordance with a determination that the prominence-display value for the UI element does not exceed the prominence threshold, cease display of the UI element in the UI associated with the second field-of-view of the device.

16. The device of claim 15, wherein the prominence-display value for the UI element corresponds to one of a level of criticality or a level of importance associated with the UI element.

17. The device of claim 15, wherein the one or more programs further cause the device to:
adjust the prominence-display value for the UI element based on a determination that a user of the device gazes at the UI element greater than a threshold length of time.

18. The device of claim 15, wherein displaying the UI element as the overlay at the second location in the UI associated with the second field-of-view of the device includes changing a perspective of the display of the UI element based at least in part on the change from the first field-of-view to the second field-of-view.

19. A non-transitory memory storing one or more programs, which, when executed by one or more processors of a device with one or more environmental sensors and a display, cause the device to:
display, via the display, a user interface (UI) element as an overlay at a first location in a UI associated with a first field-of-view of the device, wherein the first field-of-view is characterized by a first viewing vector of a physical environment;
detect a change from the first field-of-view of the device to a second field-of-view of the device, wherein the second field-of-view is characterized by a second viewing vector of the physical environment that is different from the first viewing vector; and
in response to detecting the change from the first field-of-view to the second field-of-view, determine a prominence-display value for the UI element;
in accordance with a determination that the prominence-display value for the UI element exceeds a prominence threshold, display, via the display, the UI element as the overlay at a second location in the UI associated with the second field-of-view of the device; and
in accordance with a determination that the prominence-display value for the UI element does not exceed the prominence threshold, cease display of the UI element in the UI associated with the second field-of-view of the device.

20. The non-transitory memory of claim 19, wherein the prominence-display value for the UI element corresponds to one of a level of criticality or a level of importance associated with the UI element.

21. The non-transitory memory of claim 19, wherein the one or more programs further cause the device to:
adjust the prominence-display value for the UI element based on a determination that a user of the device gazes at the UI element greater than a threshold length of time.

22. The non-transitory memory of claim 19, wherein displaying the UI element as the overlay at the second location in the UI associated with the second field-of-view of the device includes changing a perspective of the display of the UI element based at least in part on the change from the first field-of-view to the second field-of-view.

\* \* \* \* \*